(12) United States Patent
Wiersema et al.

(10) Patent No.: US 7,229,486 B2
(45) Date of Patent: Jun. 12, 2007

(54) SHOE AND LEATHER CARE PRODUCT

(75) Inventors: Pieter-Jan Wiersema, Leiden (NL); Wilhelmus Franciscus Petrus Maria Boonman, Pijnacker (NL); Shengyu Jin, Delft (NL)

(73) Assignee: SaraLee/DE N.V., Utrecht (NL)

( * ) Notice: Subject to any disclaimer, the term of this patent is extended or adjusted under 35 U.S.C. 154(b) by 49 days.

(21) Appl. No.: 10/825,626

(22) Filed: Apr. 15, 2004

(65) Prior Publication Data
US 2004/0242706 A1  Dec. 2, 2004

Related U.S. Application Data

(60) Provisional application No. 60/499,943, filed on Sep. 3, 2003, provisional application No. 60/463,755, filed on Apr. 17, 2003.

(30) Foreign Application Priority Data
Apr. 17, 2003 (EP) ................... 03076143

(51) Int. Cl.
*G09G 1/00* (2006.01)
(52) U.S. Cl. .................. 106/3; 106/7; 106/8; 106/10; 106/11; 252/8.57; 510/275
(58) Field of Classification Search .............. None
See application file for complete search history.

(56) References Cited

U.S. PATENT DOCUMENTS

| | | | | | |
|---|---|---|---|---|---|
| 3,551,169 | A | * | 12/1970 | Congdon | 106/10 |
| 3,931,079 | A | * | 1/1976 | Wise et al. | 523/167 |
| 4,497,919 | A | * | 2/1985 | Varga et al. | 524/10 |
| 4,554,083 | A | * | 11/1985 | Soldanski et al. | 252/8.57 |
| 5,443,760 | A | * | 8/1995 | Kasprzak | 424/78.03 |
| 6,190,572 | B1 | * | 2/2001 | Chen | 252/8.57 |

FOREIGN PATENT DOCUMENTS

| | | | |
|---|---|---|---|
| DE | 3541434 | * | 11/1985 |
| EP | 1000990 | * | 11/1999 |

* cited by examiner

Primary Examiner—C. Melissa Koslow
(74) Attorney, Agent, or Firm—Hoffmann & Baron, LLP

(57) ABSTRACT

The invention provides a water-based low VOC shoe and leather care product having good product properties and characteristics, which can be formulated by making an appropriate and careful selection of ingredients and their amounts. A shoe and leather care product according to the invention has been found to give results in the treatment of leather (shoes) closely resembling the results found when using a conventional, high VOC shoe care product. Furthermore, such favourable results can be achieved while significantly reducing the amount of organic solvents in the product.

35 Claims, 1 Drawing Sheet

Figure 1: SUR Cone Number 18-0150
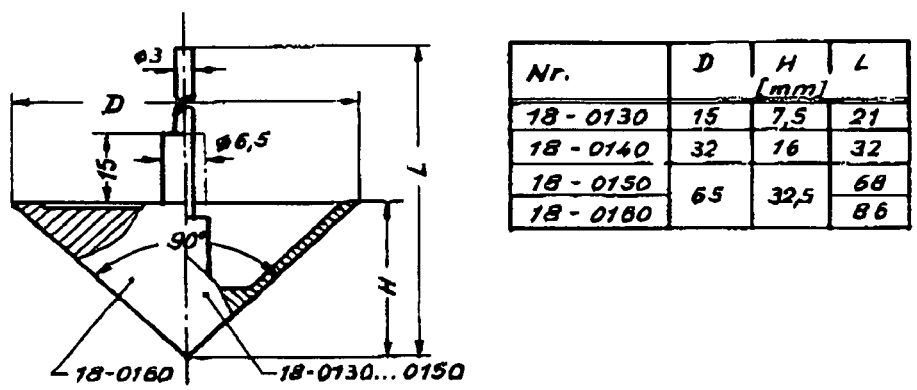

SHOE AND LEATHER CARE PRODUCT

This application claims priority from European Application EP 03076143.1 filed on 17 Apr. 2003, and U.S. Provisional Applications No. US 60/463,755, filed on 19 Apr. 17, 2003 and US 60/499,943 filed on 3 Sep. 2003, which are incorporated herein by reference.

BACKGROUND OF THE INVENTION

The invention relates to a shoe and leather care product, in particular a shoe and leather polish, to a process for preparing a shoe and leather care product and to the use of said shoe and leather care product for treating or cleaning shoes. More in particular, the invention relates to a shoe and leather care product having a reduced content of organic components, i.e. a low volatile organic content (VOC).

When the term shoe care is used in the context of the present invention it is intended to include both shoe and leather. Unless otherwise indicated herein, all percentages are percentages by weight calculated on the basis of the weight of the total shoe or leather care product.

The state of the art of the art of shoe care products, such as shoe polish, is well summarised by Peter A. Burke in Ullmann's encyclopaedia of Industrial Chemistry, Sixth edition, 2000 Electronic release on Shoe Polishes. Shoe care products are colourless or coloured pastes or fluids containing a wax phase. They are typically applied by polishing onto the leather surface of footwear such as shoes to provide a wax layer having a high gloss. Simply said, there are two classes of shoe care products: those that are oil based, and those that are based on an aqueous phase (emulsion based products).

Examples of oil based shoe care products are shoe creams and shoe polishes. A shoe polish typically consists of a mixture of waxes, such as Crude Montan wax and modified forms thereof (e.g. acid waxes, ester waxes and partly saponified waxes), Fisher Tropsch waxes and modified forms thereof (e.g. oxidised Fisher Tropsch waxes and partly saponified Fisher Tropsch waxes), polyethylene waxes and modified forms thereof (e.g. oxidised polyethylene waxes), metallocene waxes, micro waxes, ceresin, carnauba wax, candelilla wax, stearic acid, or synthetic waxes, and a mixture of solvents, such as terpene oil, mineral spirits, white spirit, aromatics free/desaromatized white spirit and the like. Oil based shoe care products are relatively hard and have a good consistency allowing an easy application to the leather.

Shoe care products based on an aqueous phase are most often made available in the form of paste or cream-like emulsions in tubes or jars, or in the form of fluids in bottles. Thickened emulsions are also known and are sold in tins or glass jars.

In the last decade environmental, toxicological and cost considerations have stimulated research into so called Low VOC Polishes. These are shoe polishes having a low (or no) content of organic solvents. The environmental considerations causing concern for volatile organic compound are rooted in ozone creating potential for these compounds and global warming. The toxicological concerns are based on the alleged risks of volatile organic compounds to human health.

In Europe as well as in the US, the use of volatile organic solvents (VOCs) is regulated. In Europe, a volatile organic compound is a compound that has a starting boiling point lower than 250 degrees Celsius at atmospheric pressure. For working environments volatile organic compounds are defined as having a vapour pressure equal to or larger then 0.01 kPa at 293.15 Kelvin. Originally in the United States VOCs were defined as volatile organic compounds having a vapour pressure of 0.1 mm Hg or larger at 70 degrees Fahrenheit. Currently an exempt list is used based on proven negligible photochemical reactivity. Within the scope of this invention a VOC is defined as a volatile organic compound that has a starting boiling point lower then 250° C. at atmospheric pressure.

High crude oil cost price during the oil crises in the past decades has furthermore created the need for formulae that are less dependent on crude oil cost price that determines the cost of petroleum distillates used in paste shoe polish like mineral spirits, kerosene, Varnish Makers and Painters Naptha, Stoddard solvent, white spirit and aromatics free/desaromatised white spirit.

Organic solvents in solvent-based shoe polishes have multiple basic functions. They assist in achieving ease of application (ease of spreading of the product and ease of buffing) of the product. They assist in achieving maximum liquefaction during application. They perform a role in cleaning the leather and in driving the waxes and oils present in the shoe polish into the pores of the leather. They ensure that any remaining wax layers of previous treatments are redissolved and also that the wax component is solubilised in the product. They further plasticise and soften the wax and facilitate removal of excess wax applied. They provide for an adequate evaporation rate, adequate product structure and stability to ensure adequate shelf life in terms of solvent retention, absence of solvent syneresis, phase separation and the like. They furthermore contribute to product consistency, weight stability and product performance stability.

All of these functions provide and support the raw materials in the product in achieving desirable surface gloss, depth of gloss, gloss durability, cleaning, nourishing, conditioning, protecting, colouring and waterproofing properties of a shoe care product. Upon reduction or removal of solvents, all these various functions have to be provided for by balancing other components in the product to ensure and retain consumer satisfaction with the current product paste shoe polish.

Basically, the only realistic alternative to reduce the level of organic solvent is to exchange organic solvent with water. Water can be introduced as an external or water continuous phase in terms of an (o/w), or oil-in-water emulsion, an internal discontinuous phase in terms of a water-in-oil emulsion, also called inverse emulsion, also called oil continuous or w/o emulsion, or a mixture of the two aforementioned approaches with a water continuous phase w/o/w emulsion or a multiple phase emulsion. In the context of the present invention, any emulsion belongs either to the class of the oil continuous emulsion systems or the class of the water continuous emulsion systems.

Clearly the state of the art of oil continuous emulsions (w/o) is such that in today's competitive environment manufacturers still are forced to revert to non-emulsion white spirit based formulation technology. Thus, producers, due to consumer preferences for white spirit based technology, do not employ oil continuous shoe polish emulsion technology.

Known problems with shoe care products of this type include the consistency of the product being too thick and thereby affecting the ease of application and spreadability of the product, drying out of the product in the tin, i.e. before use, a shine that requires a lot of work, and inferior waterproofing of the treated leather. Moreover the amount of water in the products is typically less then 56.4% and the level of white spirit not lower than 22%. It is an object of the current invention to lower use of VOCs below 22% for emulsions.

The water continuous phase approach has led to several proposed solutions. The German patent application 35 41 434 discloses a shoe care product in the form of an emulsion containing wax, emulsifier, water and an anionic polysaccharide as co-emulsifier. Although this product is free of organic solvents, it has a cream-like consistency, which does not provide the wax layer of high gloss, which is desired of a shoe polish. The European patent application 1 000 990 discloses a water based shoe care product in the form of an emulsion containing wax, water and an emulsifier. In essence, the disclosed shoe care product is based on a specific, non-ionic emulsifier, viz. an alcohol having 6 to 28 carbon atoms alkoxylated with an alkene oxide having 2 to 4 carbon atoms. It has been found that this product does not give satisfactory results when applied to a leather surface.

Thus, there is, still a need in the art for a water-based low VOC shoe or leather care product, achieving as much the same results as fully solvent based paste polishes as possible. The problem clearly is to achieve a sufficiently hard product with ingredients that result in optimally soft films to create the desired combination of product properties The applied and remaining polish film thickness after polishing of water continuous polish increases as compared to solvent based polish. This has negative effects on gloss level, gloss durability and gloss type. In order to reduce the resulting film thickness of water-based low VOC polishes, a balance between the film plasticity and hardness, inherent film adhesion capacity and film elasticity has to be struck. Addition of wax phase softening agents reduces the hardness of the product, which result in application of too high amounts of polish on the shoe. Too low plasticity of product particles in the product film results in a low removal of excess product, while too high film plasticity results in limited gloss durability. Too low inherent adhesive capacity result in near to complete removal of the film and consequently a low gloss product. Too high film adhesive capacity leads to thick films, which result in short gloss durability.

BRIEF DESCRIPTION OF THE DRAWINGS

FIG. 1 shows SUR Hollow Cone, Order Number 18-150

SUMMARY OF THE INVENTION

In accordance with the invention, it has been found that a water-based low VOC shoe or leather care product having good product properties and characteristics can be formulated by making an appropriate and careful selection of ingredients and their amounts. Accordingly, the invention relates to a shoe or leather care product comprising an aqueous phase, an oil phase, and an emulsifier system, which product has a VOC below 22 wt. %, based on the weight of the product.

A shoe care product according to the invention has been found to give results in the treatment of leather (shoes) closely resembling the results found when using a conventional, high VOC shoe care product. Furthermore, such favourable results can be achieved while significantly reducing the amount of organic solvents in the product.

DETAILED DESCRIPTION OF THE INVENTION

The term shoe or leather care product when used in the context of the present invention is intended to encompass any type of shoe or leather care product, including pastes, creams, liquid polishes, self shining polishes in liquid or cream format, silicone sponges, aerosols for protecting, conditioning, shining and cleaning smooth leather, cleaners in liquid or aerosol form, and suede and nubuck care products for protecting conditioning and cleaning. Preferably, the shoe care product is a shoe polish or a shoe cream. Most preferably, the the show care product is a shoe polish, a shoe cream, a self polishing composition, an impregnated towel or sponge or an aerosol. Shoe polishes and shoe creams are especially formulated to shine, nourish, protect clean, condition, colour, refresh and waterproof smooth leather while essentially preserving the original look and nature of the leather article and increasing the shine of the leather. Usually shoe polishes are packed in tins from metal or plastic while shoe creams are offered in glass or plastic jars, plastic or aluminium tubes with or without sponge applicator or in sachets. It is to be noted that if a shoe care product is to be packaged into a metal container, such as a tin, it is preferably free of chloride ions, in particular of sodium chloride, to avoid corrosion.

The present invention provides a water-based low VOC shoe care product, which balances sufficient consistency or paste hardness as measured by penetrometry (that is low penetration values) while providing a satisfactory paste shoe polish product. The penetration value is a key attribute for paste shoe polishes. At room temperature the penetration value is a measure for the hardness of the paste shoe polish, consequently this value is a measure for the brittleness of the paste cake and the ease/difficulty of getting the right amount of paste on the bristle or the cloth for dosing on the shoe. The penetration value can be measured as follows:

Take one sample for measurement of penetration value after storage at 17° C.

Measure with a penetrometer PNR 10 from Petrotest or equal equipment, which is cleaned regularly and calibrated and maintained regularly, (preferably every 6 months) by adequately trained personnel.

Use a falling shaft, a cone with a point having a 90° angle and a diameter D of 65 millimetre, a height H of 32.5 millimetre and a Length L of 68 millimetre as described in FIG. 1, available from Petrotest e.g. SUR Hollow Cone, Order Number 18-150, correction weights as appropriate to achieve the prescrbed total weight of 100 gram.

Store the samples 16 hours overnight in climate cabinets of 17° C.

For measuring the samples take the sample out of the climate cabinet.

Measure a sample within one minute after taking out of the climate cabinet to prevent heating up or cooling down.

Clean the cone in between measurements.

For a measurement:

1) Position the point of the cone just above the paste;
2) Drop the combination of weight, shaft and cone for five seconds;
3) Note the penetration value in units of 0.1 mm;
4) Measure three values per sample;
5) Calculate a mean value per sample to average out differences;
6) Report the batch number and note the paste shoe polish mean penetration value.

While consistency on product level as measured by penetrometry to determine product hardness should be sufficiently high, meaning low penetration values, at the micron level the solids should be soft enough to be deformable by buffing with cloth, brush or other means to be buffed to gloss, wet the leather surface, achieve high contact surface area with the leather and penetrate into pores, scuffs and crevices in order to achieve depth of gloss, gloss durability and removal of excess wax. A shoe care product according to the invention preferably has a penetration value below 60 units of 0.1 mm, more preferably between 5 and 40 units of 0.1 mm.

As mentioned, a shoe care product according to the invention comprises an aqueous phase, an oil phase, and an emulsifier system. These components will be discussed in more detail below with reference to their chemical name, their raw material name, their trade name or their INCI name (International Nomenclature of Cosmetic Ingredients).

Aqueous Phase

The aqueous phase preferably constitutes 50-90 percent by weight, and more preferably 60-90 percent by weight and particularly preferred 65-90 percent by weight of the shoe care product. Although it is possible that the aqueous phase is pure water, it way be preferred to include in the aqueous phase one or more of the following optional ingredients: silicone compounds, a colouring system, a humectant, a salt, an anticorrosive agent, and preserving agents like an antibacterial agent, or an anti-fungal agent. Typically, the combined amount of these optional ingredients will not exceed 20 percent by weight of the total product.

Suitable silicone compounds in emulsified form that can be included typically comprises 0.1-10% net weight based on the weight of the total product. Examples are silicone compounds of linear polydimethylsiloxanes having a viscosity of 5-100000 mm 2/s, dimethicone copolyol/polyether modified polydimethylsiloxanes, amine functionalised silicone oils, silicone waxes or silicone resins. It was found that these silicone compounds perform several functions in improving application properties and/or improving polishing properties and/or improving the final result of the resultant low VOC product of the current invention on the leather.

A colouring system that can be included, typically comprises 0.1-10 weight % on the weight of the total product. Like for example pigment dispersions based on for example carbon black, pigment dispersion pastes, iron oxide pigment dispersion pastes, organic pigment dispersion pastes or water-soluble dyes like for example acid dyes.

It was found that adding a humectant optimises structure properties, application properties, and product stability of the low VOC formulation. Typically comprising 0.5-10% by weight based on the total product. Non-restrictive example humectants are ethylene glycol propylene glycol, glycerol, sorbitol, or any polyethylene glycol.

It was found that any salt or combination of salts can be added to the formulation to further improve the structure of the product. Typical amounts of salt that can be added are 0.05-2 weight % based on the weight of the total product. More preferred is 0.1-1% by weight based on the weight of the total product. Still more preferred is 0.15-0.75% by weight based on the weight of the total product. Most preferred amount is 0.15-0.6% by weight based on the weight of the total product. Non-restrictive examples of suitable salts are formed by anions like benzoate, chloride, carbonate, bicarbonate, nitrite, phosphate, sulfate, pyrophosphate, sulfide, sulfite, bromide, silicate, metasilicate, citrate, polyphosphate, succinate, tartrate, oxalate, lactate, formiate, acetate, sorbate, adipate combined with any suitable monovalent cation like sodium, potassium, lithium. More preferred cations are potassium and sodium. Most preferred cation is sodium. Preferred examples salts are sodium chloride, sodium benzoate, sodium sulfate.

Suitable anti-corrosive agents that can be included are for example cyclohexyl amine, diammonium phosphate, dipotassium oxalate, sodium benzoate, sodium carbonate, sodium nitrite, disodium tetrapropenyl succinate, nitromethane, sodium silicate, triisopropanolamine, tetrasodium pyrophosphate, or any combination of the afore mentioned anti-corrosive agents. Typical addition amounts are 0.05-1 weight % based on the weight of the total product.

Suitable preserving, anti-fungal and anti-bacterial agents that can be included are for example calcium undecylenate, Pinus Pinaster Bark Extract, povidone-iodine, iodopropynyl butylcarbamate, undecylenic acid, zinc undecylenate, sodium salt of 2-pyridinthiol-1-oxide, 1,2-dibromo-2,4-dicyanobutane, phenoxyethanol, didecyldinethylammonium chloride, benzoic acid, benzyl alcohol, sodium chlorophenate, bromochlorophene, 2-bromo-2-nitropropane-1,3-diol, chloroacetamide, benzisothiazolinone-3, myrtrimonium bromide, laurtrimonium bromide (and) isopropyl alcohol, chlorothymol, formaldehyde, sodium salt of 1,2-benzisothiazolin-3-one, mixture of 3 isothiazolinones in sol. of Mg-salts, 2-4-dichloro-3,5-xylenol, imidazolidinyl urea, methylparaben, ethylparaben, propylparaben, isobutylparaben, butylparaben, 2.2' methylenebis(4-chlorophenol), dichlorophen, 1,3-dimethylol-5,5-dimethylhydantoin, glutaric dialdehyde, pentanedial-1,5, 2,6 di-t-butyl-p-cresol, 2,4,4'-trichloro2'-hydroxy diphenylether, methylchloroisothiazolinone, methylisothiazolinone, dodecanoic acid pentachlorophenyl ester, 2,4-dichlorobenzyl alcohol, propyl p-hydroxybenzoate, sodium 2-phenylphenolate, potassium sorbate, 1,2-benzisothiazolone-3, sodium salt of 1,2-benzisothiazolin-3-one, blend of 1,2-benzisothiazolone-3 and carbamate fungicide, benzotriazole, 3,4,5,6-tetrabromo-o-cresol, or any combination of the afore mentioned chemicals. Typical addition amounts are 0.01-0.5 weight % based on the weight of the total product.

Suitable defoamers that can be included are for example alcohols such as ethanol, cetyldimethicone, dimethicone, dimethiconol, disiloxane, hexylalcohol, isopropylalcohol, dimethiconesilylate, bisphenylhexanethicone, mineral oil, petroleum destilates, phenethyldisiloxane or emulsions thereof. Typical addition amounts are 0.01-0.5 weight % based on the weight of the total product.

Oil Phase

The oil phase preferably constitutes 1-50 percent by weight based on the weight of the total product, and more preferably 1-40% by weight based on the weight of the total product and more preferably 1-35% by weight based on the weight of the total product most preferably 1-30% by weight based on the weight of the shoe care product. The oil phase is defined as any individual component raw material, excluding emulsifiers, of which 2% does not molecularly dissolve completely in water (even when molten and stirred vigorously and cooled down to 20° C.) without showing phase separation and comprises waxes, optionally oil and/or organic solvent and/or fats and/or resins.

The waxes constitute 1-45% by weight based on the weight of the total product, and more preferably 1-35% by weight based on the weight of the total product and more preferably 1-30% by weight based on the weight of the total product most preferably 1-25% by weight based on the weight of the total shoe care product.

The oils constitute 0.2-20% by weight based on the weight of the total product, and more preferably 0.2-15% by weight based on the weight of the total product and more preferably 0.2-10% by weight based on the weight of the total product most preferably 0.2-7.5% by weight based on the weight of the shoe care product.

The presence of organic solvents is obviously limited as much as possible in a shoe care product according to the invention because they belong to the class of VOCs. The solvents constitute 0.1-22% by weight based on the weight of the total product, and more preferably 0.1-20% by weight based on the weight of the total product and more preferably 0.11-15% by weight based on the weight of the total product most preferably 0.1-10% by weight based on the weight of the shoe care product.

Preferably, for oil continuous products, solvents constitute 1-22% by weight based on the weight of the total product, and more preferably 1-20% by weight based on the weight of the total product and most preferably 2.5-15% by weight based on the weight of the total product.

Preferably, for water continuous products, solvents constitute 0-15% by weight based on the weight of the total product, and more preferably 0-10% by weight based on the weight of the total product and more preferably 0-7.5% by weight based on the weight of the total product most preferably 0-5% by weight based on the weight of the shoe care product.

Fats may constitute 0-30% by weight based on the weight of the total product, and more preferably 0-20% by weight based on the weight of the total product and more preferably 0-15% by weight based on the weight of the total product most preferably 0-10% by weight based on the weight of the shoe care product.

Resins may constitute 0-15% by weight based on the weight of the total product, and more preferably 0-10% by weight based on the weight of the total product and more preferably 0-7.5% by weight based on the weight of the total product most preferably 0-5% by weight based on the weight of the shoe care product.

The term waxes in the context of this invention refer to waxes in the broadest sense. Various descriptions of the raw materials belonging to the class of waxes and various ways to sub-classify these substances can inter alia be found in:

Albin H. Warth, The Chemistry and Technology of Waxes, 2$^{nd}$ edition, 1956, Rheinhold Publishing Corporation, New York, Chapman & Hall, Ltd., London chapter 2 through 8;

H. Bennett, Industrial Waxes, Volume I, Natural & Synthetic Waxes, 1975, Chemical Publishing Company, Inc. New York, N.Y. 10003, Part 1 and Part 2;

H. Bennett, Industrial Waxes, Volume II, Compounded Waxes & Technology, 1975, Chemical Publishing Company, Inc. New York, N.Y. 10003, Part 1; and U. Wolfmeier, H. Schmidt, F. L. Heinrichs, W. Payer, W. Dietsche, K. Boehlke, G. Hohner, J. Wildgruber, Waxes, Ullmann's Encyclopaedia of Industrial Chemistry, Fifth edition, 1996, VCH Verlagagesellschaft GmbH, D-69451 Weinheim, Volume A28, P103-163.

Thus all raw materials and raw material classes described in the above given sections of the four publications encompass waxes in the broadest sense within the scope of this invention, like waxes, waxy and wax-like components which have a drop point from 40-250° C. and of which 2% cannot molecularly dissolve completely in water (even after melting vigorous mixing and subsequent cooling down to room temperature) without showing phase separation. The drop point is determined according to ASTM D127-87 (1999) Standard Test Method for Drop Melting Point of Petroleum Wax Including Petrolatum.

Non-restrictive examples of these materials are:

Mineral waxes like for example paraffin wax, microcrystalline wax, slack wax, montan wax and modified forms thereof (e.g. acid waxes, ester waxes and partly saponified waxes), lignite wax, ozocerite, ceresin, utah wax, peat wax.

Plant derived waxes for example carnauba wax, candelilla wax, ricebran wax, orange wax, cotton wax, esparto wax, fir wax, ouricory wax, palm wax, rice oil wax, sugar cane wax, cocoa butter wax Animal waxes like for example bees wax, lanolin or wool wax, chinese wax, shellac wax, spermaceti wax, insect wax Fisher Tropsch waxes and modified forms thereof (e.g. oxidised Fisher Tropsch waxes and partly saponified Fisher Tropsch waxes), Polyolefin waxes synthesised from monomers like ethylene and propylene. For example ethylene or metallocene or polypropylene waxes and modified forms thereof (e.g. oxidised polyethylene waxes, cracked depolymerised polyethylene or polymerised polyethylene, chemically modified polyethylene or polyethylene copolymerised with for example acrylic acid and/or maleic anhydride and/or vinyl acetate)

Synthetic waxes and polymers, which are available from for example Baker Petrolite or Honeywell Specialty Wax and Additives are for example POLYWAX® Synthetic Hydrocarbon range, PETROLITE® Copolymer range, chemically modified polymers like POLYMEKON®, PETROLITE® CA-11, PETROLITE® C-400, PETROLITE® WB-5, PETROLITE® WB-17, CERAMER range, UNILIN® range, UNITHOX® range, UNICID® range, VYBAR® synthetic hydrocarbon range, CARDIS® Oxidised Wax range, PETROLITE® Synthetic Hydrocarbon-Based Oxidised Products range and the range of wax products from the A-C brand.

Of course any combination of any of the above mentioned wax raw materials is also within the scope of the invention.

While all matter of wax can be used to create a shoe care product within the scope of the invention, there are preferred wax classes and combinations there off which yield better polishes then other possible combinations.

More preferred wax raw materials classes that can be used are for example:

paraffins 4-20% by weight of the total product, more preferred 4-15% by weight of the total product still more preferred 4-12% by weight of the total product; In principle any paraffin can be used. More preferred paraffins have melting points ranging between 58-63. It was found that these paraffins provide the wax film of the low VOC formulation with desirable deformation properties on the leather.

and/or microcrystalline waxes 0.1-15% by weight of the total product, more preferred 0.5-10% by weight of the total product still more preferred 0.75-5% by weight of the total product; In principle any microcrystalline wax can be used. Congealing point of petroleum waxes, including petrolatum according to ASTM D938 70-76 IC. Needle penetration of petroleum waxes according to ASTM D1321 smaller then 25 units of 0.1 mm. Drop melting point according to ASTM D127 75-81° C. It was found that microcrystalline waxes provide the low VOC formulation with required adhesion on the leather and desirable crystallisation properties during processing.

Optionally one of the following waxes or a combination of two or more can be chosen:

Montan wax and modified forms thereof (e.g. acid waxes, ester waxes and partly saponified waxes) 0.1-10% by weight of the total product, more preferred 0.25-7.5% by weight of the total product, still more preferred 0.5-6% by weight of the total product; It was found Montan waxes provides the low VOC formulation with gloss and film hardness on the leather;

and/or carnauba wax 0.1-10% by weight of the total product, more preferred 0.25-7.5% by weight of the total product, still more preferred 0.5-6% by weight of the total product; It was found that carnauba wax provides the low VOC formulation with gloss and film hardness on the leather;

and/or lanoin or wool wax 0.1-10% by weight of the total product, more preferred 0.25-7.5% by weight of the total product, still more preferred 0.5-4% by weight of the total product; It was found that wool wax provides the low VOC formulation with waxy gloss appearance after polishing and plastercised, pliable, soft product films;

and/or Fisher Tropsch waxes and modified forms thereof (e.g. oxidised Fisher Tropsch waxes and partly saponified Fisher Tropsch waxes) 0.5-15% by weight of the total product, more preferred 0.25-7.5% by weight of the total product, still more preferred 0.5-6% by weight of the total product; It was found Fisher Tropsch Waxes provides the low VOC formulation with gloss and film hardness and durability on the shoe;

and or Polyethylene wax (e.g. oxidised polyethylene waxes, cracked depolymerised polyethylene or polymerised polyethylene, chemically modified polyethylene or polyethylene copolymerised with for example acrylic acid and/or maleic anhydride and/or vinyl acetate) 0.5-15% by weight of the total product, more preferred 0.25-7.5% by weight of the total product still more preferred 0.5-6% by weight of the total product; It was found that Polyethylene waxes provide the low VOC formulation with gloss and film hardness and durability on the shoe;

products from Baker Petrolite like POLYWAX® Synthetic Hydrocarbon range, PETROLITE® Copolymer range, Chemically Modified Polymers like POLYMEKON®, PETROLITES® CA-11, PETROLITE® C-400, PETROLITE® WB-5, PETROLITE® WB-17, CERAMER range, UNILIN® range, UNITHOX® range, UNICID® range, VYBAR® synthetic hydrocarbon range, CARDIS® Oxidised Wax range, PETROLITE® Synthetic Hydrocarbon-Based Oxidised Products range and the range of wax products from the A-C brand from Honeywell all in preferred amounts of 0.5-15% by weight of the total product, more preferred 0.25-7.5% by weight of the total product still more preferred 0.5-6% by weight of the total product.

A combination of the above-mentioned more preferred wax materials in combination with the components below have to be compounded to provide optimal polishes. The congealing point according to ASTM D938 of the total combined oil and emulsifier phase preferably lies between 30° C. and 100° C. Still more preferably the congealing point according to ASTM D938 of the total combined oil and emulsifier phase lies between 40° C. and 90° C. Still more preferably the congealing point according to ASTM D938 of the total combined oil and emulsifier phase lies between 45° C. and 80° C.

For oil continuous products the congealing point according to ASTM D938 of the total combined oil and emulsifier phase preferably lies between 30° C. and 90° C. Still more preferably the congealing point according to ASTM D938 of the total combined oil and emulsifier phase lies between lies between 40° C. and 80° C. Still more preferably the congealing point according to ASTM D938 of the total combined oil and emulsifier phase lies between lies between 45° C. and 70° C.

For water continuous products the congealing point according to ASTM D938 of the total combined oil and emulsifier phase preferably lies between 40° C. and 100° C. Still more preferably the congealing point according to ASTM D938 of the total combined oil and emulsifier phase lies between lies between 45° C. and 90° C. Still more preferably the congealing point according to ASTM D988 of the total combined oil and emulsifier phase lies between lies between 50° C. and 80° C.

For oil continuous products the wax blend should preferably be apolar and the carbon chains of highly branched nature.

For water continuous products the wax blend to be chosen is more flexible and allows for more variation. Blends that work together with the emulsifier system contain more oxygen, like UNITHOX® range, UNICID® range, montan acid waxes, montan ester waxes.

Oils within the scope of this invention can be any oil, for example mineral oil, vegetable oil, animal oil. Non-restrictive examples are soy oil, jojoba oil, fish oil, castor oil, ricinus oil, cod liver oil, linseed oil, blown Ed oil, tall oil, lanoline anhydride, coconut oil, almond oil, mineral oils for example with a density ranging from 0.817-0.865 (DIN 51757) and a viscosity at 40° C. ranging from 3.6-70 mm$^2$/s.

Solvents within the scope of this invention can be any solvent. Non restrictive examples are mineral spirits, kerosene, Varnish Makers and Painters Naptha, Stoddard solvent, white spirit and aromatics free/desaromatised white spirit, C9-12 Alkane, C10-13 Allure, C11-14 Alkane, C13-15 Alkane, C14-17 Alkane, C15-19 Alkane, C15-23 Alkane, C18-21 Alkane, C8-9 Alkane/Cycloalkane, C9-10 Alkane/Cycloalkane, C9-11 Alkane/Cycloalkane, C9-16 Alkane/Cycloalkane, C10-12 Alkane/Cycloalkane, C11-14 Alkane/Cycloalkane, C11-15 Alkane/Cycloalkane, C12-13 Alkane/Cycloalkane, C7-8 Isoparaffin, C8-9 Isoparaffin, C9-11 Isoparaffin, C9-13 Isoparaffin, C10-11 Isoparaffin, C10-12 Isoparaffin, C10-13 Isoparaffin, C11-12 Isoparaffin, C11-13 Isoparaffin, C11-14 Isoparaffin, C12-20 Isoparaffin, C13-14 Isoparaffin.

A fat within the scope of this invention is any fat from either plant or animal origin. Sources could be any partially or completely hydrogenated vegetable or animal oil. Non-restrictive examples are hydrogenated plant derived fats and oils, tallow fat, hydrogenated castor oil, tall oil. Preferred fats have a melting point in between 40° C. and 80° C., still more preferred fats have a melting point in between 50° C. and 75° C., still more preferred fats have a melting point in between 58° C. and 70° C. It was found that fat can be used instead of paraffin and is used for the same purpose. It was found fully hydrogenated castor oil provides low VOC formulations with improved gloss on shoe and improved structure properties. Hydrogenated castor oil is not suitable as a replacement for paraffin.

A resin within the scope of this invention comprises any substance consisting of any class of amorphous solids or semisolids. Resins are found in nature and are chiefly of vegetable origin. They are typically light yellow to dark brown in colour; tasteless; odourless or faintly aromatic; translucent or transparent; brittle, fracturing like glass; and flammable, burning with a smoky flame. Resins are soluble in alcohol, ether, and many hydrocarbons but are insoluble in water. Resins within the scope of this invention are chemically modified forms of rosin, wood rosin, colophonium. It was found that these components provide low VOC formulations with improved gloss on leather and the increase of adhesive properties.

The oil phase may comprise 0-10% by weight based on the weight of the total product of other optional ingredients. Preferred examples include perfume, silicone compounds.

If present, a silicone compound will constitute 0.1-10% by weight of the total product, preferably 0.2-5% by weight of the total product, still more preferably 0.3-3.5% by weight of the total product. They may be included to enhance the ease of polishing, gloss characteristics and improve water repellency properties of the shoe care product.

Silicone compound additions typically comprise linear polydimethylsiloxanes with a viscosity of 5-100000 mm$^2$/s, dimethicone copolyol/polyether modified polydimethylsiloxanes with HLB value lower than 8, amine functionalied silicone oils, silicone waxes or silicone resins. If dosed in amounts over 1% the risk exists with insufficient affinitiy for the rest of the oil phase, that the components will not stay homogenously dispersed and will cause phase separation in the product. It then is more prudent to use emulsified forms of these components and add them in the latest stages of production during cooling to the total product.

Any conventional perfume may be included to impart a pleasant odour to the shoe care product. Typically, if included, a perfume will be present in an amount ranging from 0.01-5 wt. %, usually ranging from 0.01-0.5 weight % based on the weight of the total product. Of course, it will depend on the polarity of the perfume used, whether it will be present in the aqueous or oil phase of the shoe care product. The combined amounts of perfumes will generally not exceed 5%. Examples of raw materials suitable for perfume compositions can be found in Perfumes, Art, Science and Technology, edited by P. M. Müller and D. Larparsky, Blackie Academic & Professional, an imprint of Chapman & Hall, 1991. Example materials are essential oils from wood processing like terpenes, vegetable turpentine, hexyl cinnamic aldehyde, coumarin, citronella, citronellol, turpentine oil, camphor, diethylpthalate, benzyl alcohol, cinnamic alcohol, benzyl salycilate, d-limonene. Perfume is added in typical concentration of 0.05-5 weight % based on the weight of the total product. By definition perfume is a VOC in most cases a complex mixture of VOCs, which can be water and/or oil soluble depending on the solubility parameters of the components. For practical purposes perfume is added to the total product. In case the e.g. terpene oils are added in concentrations over 0.5%, the perfume in the amount of 0.5-5% is added also because it has solubilising and plasticising activity on the waxes in the oil phase and then acts like a solvent.

Emulsifier System

In accordance with the invention, the emulsifier system will preferably constitute 0.2-20 wt. %, based on the weight of the shoe care product. Preferably, it comprises at least one surfactant and at least one co-emulsifier.

Preferably the surfactant is used in amounts of 0.2-10% by weight of the total product, more preferably 0.5-8% by weight of the total product, most preferably 0.5-7% by weight of the total product.

Preferably the co-emulsifier is used in amounts of 0.2-16% by weight of the total product, more preferably 0.5-13% by weight of the total product, most preferably 1-10% by weight of the total product.

The total combined amount of the emulsifier system preferably comprises 0.2-20% by weight of the total product, more preferably 0.5-15% by weight of the total product, still more preferably 1-13% by weight of the total product and most preferably 2-12% by weight of the total product.

The ratio of surfactant versus co-emulsifier ranges calculated on the combined amount of the emulsifier system ranges from 10-90% by weight surfactant and 10-90% by weight co-emulsifier, more preferably 10-75% by weight surfactant and 10-75% by weight co-emulsifier.

For oil continuous emulsion systems the total combined amount of the emulsifier system preferably comprises 0.2-12% by weight of the total product, more preferably 0.5% by weight of the total product, still more preferably 0.5-7% by weight of the total product and most preferably 0.5-6% by weight of the total product.

For water continuous emulsion systems the total combined amount of the emulsifier system preferably comprises 0.2-20 wt. %, more preferably 2-15% by weight of the total product, still more preferably 3-18% by weight of the total product and most preferably 4-12% by weight of the total product.

For water continuous emulsion systems, the total summation of the saponification value, the hydroxyl value, and the nitrogen value as defined specifically below of all the raw material components in the product with more then 14 carbon atoms per molecule in the shoe care product should be between 0.5 and 40 mg KOH per gram of the resulting shoe care product, preferably between 1 and 35 mg KOH per gram of the resulting shoe care product, still more preferably between 1.5 and 80 mg KOH per gram of the resulting shoe care product, still more preferably between 1.5 and 25 mg KOH per gram of the resulting shoe care product, most preferably between 1.5 and 17.5 mg KOH per gram of the resulting shoe care product as calculated from constituent raw materials in the product.

For oil continuous emulsion systems the total summation of the saponification value, the hydroxyl value, and the nitrogen value as defined specifically below of all the raw material components in the product with more then 14 carbon atoms per molecule in the shoe care product should be between 0.5 and 20 mg KOH per gram of the resulting shoe care product, preferably between 1 and 15 mg KOH per gram of the resulting shoe care product, still more preferably between 1.5 and 10 mg KOH per gram of the resulting shoe care product, still more preferably between 1.5 and 8 mg KOH per gram of the resulting shoe care product, most preferably between 1.5 and 7 mg KOH per gram of the resulting shoe care product as calculated from constituent raw materials in the product.

For water continuous emulsion systems the total summation of the saponification value, the hydroxyl value, and the nitrogen value as defined specifically below of the all raw material components in the product with more then 14 carbon atoms per molecule in the shoe care product should be between 1 and 40 mg KOH per gram of the resulting shoe care product, preferably between 2 and 35 mg KOH per gram of the resulting shoe care product, still more preferably between 5 and 30 mg KOH per gram of the resulting shoe care product, still more preferably between 7 and 25 mg KOH per gram of the resulting shoe care product, most preferably between 8 and 17.5 mg KOH per gram of the resulting shoe care product as calculated from constituent raw materials in the product.

The saponification value of raw materials is defined by ASTM D5558-95(2001) Standard Test Method for Determination of the SAPONIFICATION VALUE of Fats and Oils.

The hydroxyl value of raw materials can be determined by ASTM D1957-86(2001) Standard Test Method for HYDROXYL VALUE of Fatty Oils and Acids.

The nitrogen value of raw materials is defined by multiplying the value defined by ASTM E258-67(1996) el Standard Test Method for TOTAL NITROGEN in Organic Materials by Modified Kjeldahl Method with 40 mg KOH/gram.

A non-restrictive example of modification to exclude disturbing influences is a procedure for determining the absolute acid number of the acids as determined by alkaline epton titration according to a modification of standard ISO 2271 Surface active agents: Determination of anionic-active matter by manual or mechanical direct two phase titration procedure. Using 10 ml NaOH 0.1N instead of 10 ml mined acid indicator and add 10 drops of dichlorofluoresceine indicator (weigh 0.05 g dichlorofluoresceine in a beaker. Dissolve in 47 ml water and 3 ml 0.1 N NaOH). The endpoint is reached as soon as the chloroform layer turns fluorescent pink The surfactant system preferably comprises at least one anionic and/or cationic and/or amphoteric and/or non-ionic surfactant. The cationic surfactant is not used in combination with an anionic surfactant or an amphoteric surfactant in its anionic form as this move incapacitates the surfactant action of both surfactants.

The co-emulsifier system preferably comprises a mixture of carboxylic acids and/or fatty acids in combination with multivalent neutralizing agents and/or multivalent metal cations and/or multivalent metal soaps and/or di-, tri- or multi-amine soaps and/or a mire of any fatty acid derivatives including but not limited to e.g. fatty acid esters and/or any derivatives thereof including but not limited to e.g. alkoxylated fatty acid ester, and/or fatty alcohols and/or any derivatives thereof including but not limited to e.g. alkoxylated fatty alcohols and/or fatty acid amides and/or any derivatives thereof including but not limited to alkoxylated fatty acid amides and/or amides created by performing a condensation reaction of an alkanolamine with a fatty acid and/or any derivatives thereof including but not limited to alkoxylated fatty acid alkanolamides and/or fatty acid amines and/or any derivatives thereof including but not limited to alkoxylated fatty acid amines and/or fatty acid aminéoxides and/or any derivatives thereof including but not limited to alkoxylated fatty acid amine oxides and/or oil-soluble dye complex.

The co-emulsifier is a mixture of carboxylic acids and/or fatty acids in combination with multivalent neutralising agents and/or multivalent metal cations and/or multivalent metal soaps and/or di-, tri- or multi- amine soaps and/or a mixture of any fatty acid derivatives including fatty acid esters and/or fatty alcohols and/or fatty acid amides and/or fatty acid amines and/or fatty acid amine oxides and/or any derivatives thereof. In preferred embodiments, each constituent material of the co-emulsifier has a HLB value below 13, preferably below 10, more preferably below 8.

The term multivalent amine refers within the scope of this invention to any molecule comprising more than one chemical functionality containing a nitrogen atom that can conduct a reaction with a carboxylic acid or a fatty acid either transferring hydrogen to the nitrogen atoms or in case of quaternary nitrogen atoms replacing strong counter anions of the positively charged nitrogen with the anions of the acid.

Any combination of the constituents in the co-emulsifier phase is possible depending on the required performance requirements—regarding good application properties, polishing properties, on-shoe product performance properties, product stability performance properties, and required processing characteristics—a suitable combination should be chosen.

Preferred combinations of co-emulsifier and surfactant system are listed below. As a rule of thumb the more components available in the co-emulsifier system the better the structure of the product. Usually a minim of two components in the co-emulsifier system is used. It has been found that mixtures of 2 or more co-emulsifiers provide for favourable structure properties of low VOC formulations.

A summary of non-restrictive examples of preferred combinations of co-emulsifier system and surfactant includes:

1 Carboxylic acids including any derivatives thereof, fatty alcohol including any derivatives thereof, fatty acid esters including any derivatives thereof, fatty acid amides including any derivatives thereof, fatty acid alkanol amides including any derivative thereof, fatty acid amines including any derivatives thereof, fatty acid amineoxides including any derivatives thereof, carboxylic acid soaps with multivalent amines or carboxylic acid soaps with multivalent metal cations, oil-soluble dye complex with at least one surfactant out of anionic surfactant, non-ionic surfactant, amphoteric surfactant in anionic form.

2 Carboxylic acids including any derivatives thereof, fatty alcohol including any derivatives thereof, fatty acid esters including any derivatives thereof, fatty acid amides including any derivatives thereof, fatty acid alkanol amides including any derivative thereof, fatty acid amines including any derivatives thereof, fatty acid amineoxides including any derivatives thereof, carboxylic acid soaps with multivalent amines or carboxylic acid soaps with multivalent metal cations, with at least one surfactant out of anionic surfactant, non-ionic surfactant, amphoteric surfactant in anionic form.

3 Carboxylic acids including any derivatives thereof, fatty alcohol including any derivatives thereof, fatty acid esters including any derivatives thereof, fatty acid amides including any derivatives thereof, fatty acid alkanol amides including any derivative thereof, fatty acid amineoxides including any derivatives thereof, carboxylic acid soaps with multivalent amines or carboxylic acid soaps with multivalent metal cations, oil-soluble dye complex with at least one surfactant out of anionic surfactant, non-ionic surfactant, amphoteric surfactant in anionic form.

4 Carboxylic acids including any derivatives thereof, fatty alcohol including any derivatives thereof, fatty acid esters including any derivatives thereof, fatty acid amides including any derivatives thereof, fatty acid alkanol amides including any derivative, thereof, fatty acid amineoxides including any derivatives thereof, carboxylic acid soaps with multivalent amines or carboxylic acid soaps with multivalent metal cations, with at least one surfactant out of anionic surfactant, non-ionic surfactant, amphoteric surfactant in anionic form.

5 Carboxylic acids including any derivatives thereof, fatty alcohol including any derivatives thereof, fatty acid esters including any derivatives thereof, fatty acid amides including any derivatives thereof, fatty acid alkanol amides including any derivative thereof, carboxylic acid soaps with multivalent amines or carboxylic acid soaps with multivalent metal cations, oil-soluble dye complex with at least one surfactant out of anionic surfactant, non-ionic surfactant, amphoteric surfactant in anionic form.

6 Carboxylic acids including any derivatives thereof, fatty alcohol including any derivatives thereof, fatty acid esters including any derivatives thereof, fatty acid amides including any derivatives thereof, fatty acid alkanol amides including any derivative thereof, carboxylic acid soaps with multivalent amines or carboxylic acid soaps with multivalent metal cations, with at least one surfactant out of anionic surfactant, non-ionic surfactant, amphoteric surfactant in anionic form.

7 Fatty alcohol including any derivatives thereof, fatty acid esters including any derivatives thereof, fatty acid amides including any derivatives thereof, fatty acid alkanol amides including any derivative thereof, fatty acid amines including any derivatives thereof, fatty acid aminoxides including any derivatives thereof, carboxylic acid soaps with multivalent amines or carboxylic acid soaps with multivalent metal cations, oil-soluble dye complex with at least one surfactant out of anionic surfactant, non-ionic surfactant, amphoteric surfactant in anionic form.

8 Fatty alcohol including any derivatives thereof, fatty acid esters including any derivatives thereof, fatty acid amides including any derivatives thereof, fatty acid alkanol amides including any derivative thereof, fatty acid amines including any derivatives thereof, fatty acid aminoxides including any derivatives thereof, carboxylic acid soaps with multivalent amines or carboxylic acid soaps with multivalent metal cations, with at least one surfactant out of anionic surfactant, non-ionic surfactant, amphoteric surfactant in anionic form.

9 Fatty alcohol including any derivatives thereof, fatty acid esters including any derivatives thereof, fatty acid amides including any derivatives thereof, fatty acid alkanol amides including any derivative thereof, fatty acid amineoxides including any derivatives thereof, carboxylic acid soaps with multivalent amines or carboxylic acid soaps with multivalent metal cations, oil-soluble dye complex with at least one surfactant out of anionic surfactant, non-ionic surfactant, amphoteric surfactant in anionic form.

10 Fatty alcohol including any derivatives thereof, fatty acid esters including any derivatives thereof, fatty acid amides including any derivatives thereof, fatty acid alkanol amides including any derivative thereof, fatty acid amineoxides including any derivatives thereof, carboxylic acid soaps with multivalent amines or carboxylic acid soaps with multivalent metal cations, with at least one surfactant out of anionic surfactant, non-ionic surfactant, amphoteric surfactant in anionic form.

11 Fatty alcohol including any derivatives thereof, fatty acid esters including any derivatives thereof, fatty acid amides including any derivatives thereof, fatty acid alkanol amides including any derivative thereof, carboxylic acid soaps with multivalent amines or carboxylic acid soaps with multivalent metal cations, oil-soluble dye complex with at least one surfactant out of anionic surfactant, non-ionic surfactant, amphoteric surfactant in anionic form.

12 Fatty alcohol including any derivatives thereof, fatty acid esters including any derivatives thereof, fatty acid amides including any derivatives thereof, fatty acid alkanol amides including any derivative thereof, carboxylic acid soaps with multivalent amines or carboxylic acid soaps with multivalent metal cations, with at least one surfactant out of anionic surfactant, non-ionic surfactant, amphoteric surfactant in anionic form.

13 Fatty alcohol including any derivatives thereof, fatty acid esters including any derivatives thereof, fatty acid amides including any derivatives thereof, carboxylic acid soaps with multivalent amines or carboxylic acid soaps with multivalent metal cations, oil-soluble dye complex with at least one surfactant out of anionic surfactant, non-ionic surfactant, amphoteric surfactant in anionic form.

14 Fatty alcohol including any derivatives thereof, fatty acid esters including any derivatives thereof, fatty acid amides including any derivatives thereof, carboxylic acid soaps with multivalent amines or carboxylic acid soaps with multivalent metal cations, with at least one surfactant out of anionic surfactant, non-ionic surfactant, amphoteric surfactant in anionic form.

15 Fatty alcohol including any derivatives thereof, fatty acid esters including any derivatives thereof, fatty acid alkanol amides including any derivative thereof, carboxylic acid soaps with multivalent amines or carboxylic acid soaps with multivalent metal cations, oil-soluble dye complex with at least one surfactant out of anionic surfactant, non-ionic surfactant, amphoteric surfactant in anionic form.

16 Fatty alcohol including any derivatives thereof, fatty acid esters including any derivatives thereof, fatty acid alkanol amides including any derivative thereof, carboxylic acid soaps with multivalent amines or carboxylic acid soaps with multivalent metal cations, with at least one surfactant out of anionic surfactant, non-ionic surfactant, amphoteric surfactant in anionic form.

17 Fatty alcohol including any derivatives thereof, fatty acid amides including any derivatives thereof, fatty acid alkanol amides including any derivative thereof, carboxylic acid soaps with multivalent amines or carboxylic acid soaps with multivalent metal cations, oil-soluble dye complex with at least one surfactant out of anionic surfactant, non-ionic surfactant, amphoteric surfactant in anionic form.

18 Fatty alcohol including any derivatives thereof, fatty acid amides including any derivatives thereof, fatty acid alkanol amides including any derivative thereof, carboxylic acid soaps with multivalent amines or carboxylic acid soaps with multivalent metal cations, with at least one surfactant out of anionic surfactant, non-ionic surfactant, amphoteric surfactant in anionic form 19 Fatty acid esters including any derivatives thereof, fatty acid amides including any derivatives thereof, fatty acid alkanol amides including any derivative thereof, carboxylic acid soaps with multivalent amines or carboxylic acid soaps with multivalent metal cations, oil-soluble dye complex with at least one surfactant out of anionic surfactant, non-ionic surfactant, amphoteric surfactant in anionic form.

20 Fatty acid esters including any derivatives thereof, fatty acid amides including any derivatives thereof, fatty acid alkanol amides including any derivative thereof, carboxylic acid soaps with multivalent amines or carboxylic acid soaps with multivalent metal cations, with at least one surfactant out of anionic surfactant, non-ionic surfactant, amphoteric surfactant in anionic form.

21 Fatty alcohol including any derivatives thereof, fatty acid esters including any derivatives thereof, carboxylic acid soaps with multivalent amines or carboxylic acid soaps with multivalent metal cations, oil-soluble dye complex with at least one surfactant out of anionic surfactant, non-ionic surfactant, amphoteric surfactant in anionic form.

22 Fatty alcohol including any derivatives thereof, fatty acid esters including any derivatives thereof, carboxylic acid soaps with multivalent amines or carboxylic acid soaps with multivalent metal cations, with at least one surfactant out of anionic surfactant, non-ionic surfactant, amphoteric surfactant in anionic form.

23 Fatty alcohol including any derivatives thereof, fatty acid alkanol amides including any derivative thereof, carboxylic acid soaps with multivalent amines or carboxylic acid soaps with multivalent metal cations, oil-soluble dye complex with at least one surfactant out of anionic surfactant, non-ionic surfactant, amphoteric surfactant in anionic form.

24 Fatty alcohol including any derivatives thereof, fatty acid alkanol amides including any derivative thereof, carboxylic acid soaps with multivalent amines or carboxylic acid soaps with multivalent metal cations, with at least one surfactant out of anionic surfactant, non-ionic surfactant, amphoteric surfactant in anionic form.

25 Fatty acid esters including any derivatives thereof, fatty acid amides including any derivatives thereof, carboxylic acid soaps with multivalent amines or carboxylic acid soaps with multivalent metal cations, oil-soluble dye complex with at least one surfactant out of anionic surfactant, non-ionic surfactant, amphoteric surfactant in anionic form.

26 Fatty acid esters including any derivatives thereof, fatty acid amides including any derivatives thereof, carboxylic acid soaps with multivalent amines or carboxylic acid soaps with multivalent metal cations, with at least one surfactant out of anionic surfactant, non-ionic surfactant, amphoteric surfactant in anionic form.

27 Patty alcohol including any derivatives thereof, carboxylic acid soaps with multivalent amines or carboxylic acid soaps with multivalent metal cations, oil-soluble dye complex with at least one surfactant out of anionic surfactant, non-ionic surfactant, amphoteric surfactant in anionic form.

28 Fatty alcohol including any derivatives thereof, carboxylic acid soaps with multivalent amines or carboxylic acid soaps with multivalent metal cations, with at least one surfactant out of anionic surfactant, non-ionic surfactant, amphoteric surfactant in anionic form.

29 Fatty acid esters including any derivatives thereof, carboxylic acid soaps with multivalent amines or carboxylic acid soaps with multivalent metal cations, oil-soluble dye complex with at least one surfactant out of anionic surfactant, non-ionic surfactant, amphoteric surfactant in anionic form.

30 Patty acid esters including any derivatives thereof, carboxylic acid soaps with multivalent amines or carboxylic acid soaps with multivalent metal cations, with at least one surfactant out of anionic surfactant, non-ionic surfactant, amphoteric surfactant in anionic form.

31 Fatty acid alkanol amides including any derivative thereof, carboxylic acid soaps with multivalent amines or carboxylic acid soaps with multivalent metal cations, oil-soluble dye complex with at least one surfactant out of anionic surfactant, non-ionic surfactant, amphoteric surfactant in anionic form.

32 Fatty acid alkanol amides including any derivative thereof, carboxylic acid soaps with multivalent amines or carboxylic acid soaps with multivalent metal cations, with at least one surfactant out of anionic surfactant, non-ionic surfactant, amphoteric surfactant in anionic form.

33 Fatty acid amides including any derivatives thereof, carboxylic acid soaps with multivalent amines or carboxylic acid soaps with multivalent metal cations, oil-soluble dye complex with at least one surfactant out of anionic surfactant, non-ionic surfactant, amphoteric surfactant in anionic form.

34 Fatty acid amides including any derivatives thereof, carboxylic acid soaps with multivalent amines or carboxylic acid soaps with multivalent metal cations, with at least one surfactant out of anionic surfactant, non-ionic surfactant, amphoteric surfactant in anionic form.

35 Fatty alcohol including any derivatives thereof, fatty acid esters including any derivatives thereof, fatty acid amides including any derivatives thereof, carboxylic acid soaps with multivalent amines or carboxylic acid soaps with multivalent metal cations, oil-soluble dye complex with at least one surfactant out of anionic surfactant, non-ionic surfactant, amphoteric surfactant in anionic form.

36 Fatty alcohol including any derivatives thereof, fatty acid esters including any derivatives thereof, fatty acid amides including any derivatives thereof, carboxylic acid soaps with multivalent amines or carboxylic acid soaps with multivalent metal cations, with at least one surfactant out of anionic surfactant, non-ionic surfactant, amphoteric surfactant in anionic form.

37 Fatty alcohol including any derivatives thereof, fatty acid esters including any derivatives thereof, fatty acid alkanol amides including any derivative thereof, carboxylic acid soaps with multivalent amines or carboxylic acid soaps with multivalent metal cations, oil-soluble dye complex with at least one surfactant out of anionic surfactant, non-ionic surfactant, amphoteric surfactant in anionic form.

38 Fatty alcohol including any derivatives thereof, fatty acid esters including any derivatives thereof, fatty acid alkanol amides including any derivative thereof, carboxylic acid soaps with multivalent amines or carboxylic acid soaps with multivalent metal cations, with at least one surfactant out of anionic surfactant, non-ionic surfactant, amphoteric surfactant in anionic form.

39 Fatty alcohol including any derivatives thereof, fatty acid amides including any derivatives thereof, fatty acid alkanol amides including any derivative thereof, carboxylic acid soaps with multivalent amines or carboxylic acid soaps with multivalent metal cations, oil-soluble dye complex with at least one surfactant out of anionic surfactant, non-ionic surfactant, amphoteric surfactant in anionic form.

40 Fatty alcohol including any derivatives thereof, fatty acid amides including any derivatives thereof, fatty acid alkanol amides including any derivative thereof, carboxylic acid soaps with multivalent amines or carboxylic acid soaps with multivalent metal cations, with at least one surfactant out of anionic surfactant, non-ionic surfactant, amphoteric surfactant in anionic form.

41 Fatty acid esters including any derivatives thereof, fatty acid amides including any derivatives thereof, fatty acid alkanol amides including any derivative thereof, carboxylic acid soaps with multivalent amines or carboxylic acid soaps with multivalent metal cations, oil-soluble dye complex with at least one surfactant out of anionic surfactant, non-ionic surfactant, amphoteric surfactant in anionic form.

42 Fatty acid esters including any derivatives thereof, fatty acid amides including any derivatives thereof, fatty acid alkanol amides including any derivative thereof, carboxylic acid soaps with multivalent amines or carboxylic acid soaps with multivalent metal cations, with at least one surfactant out of anionic surfactant, non-ionic surfactant, amphoteric surfactant in anionic form.

43 Fatty alcohol including any derivatives thereof, fatty acid esters including any derivatives thereof, carboxylic acid soaps with multivalent amines or carboxylic acid soaps with multivalent metal cations, oil-soluble dye complex with at least one surfactant out of anionic surfactant, non-ionic surfactant, amphoteric surfactant in anionic form.

44 Fatty alcohol including any derivatives thereof, fatty acid esters including any derivatives thereof, carboxylic acid soaps with multivalent amines or carboxylic acid soaps with multivalent metal cations, with at least one surfactant out of anionic surfactant, non-ionic surfactant, amphoteric surfactant in anionic form.

45 Fatty acid esters including any derivatives thereof, fatty acid amides including any derivatives thereof, carboxylic acid soaps with multivalent amines or carboxylic acid soaps with multivalent metal cations, with at least one surfactant out of anionic surfactant, non-ionic surfactant, amphoteric surfactant in anionic form.

46 Fatty acid alkanol amides including any derivative thereof, carboxylic acid soaps with multivalent amines or carboxylic acid soaps with multivalent metal cations, with at least one surfactant out of anionic surfactant, non-ionic surfactant, amphoteric surfactant in anionic form.

47 Carboxylic acids including any derivatives thereof, carboxylic acid soaps with multivalent amines or carboxylic acid soaps with multivalent metal cations, oil-soluble dye complex with at least one surfactant out of anionic surfactant, non-ionic surfactant, amphoteric surfactant in anionic form.

48 Carboxylic acids including any derivatives thereof, carboxylic acid soaps with multivalent amines or carboxylic acid soaps with multivalent metal cations, with at least one surfactant out of anionic surfactant, non-ionic surfactant, amphoteric surfactant in anionic form.

49 Fatty alkohols including any derivatives thereof, oil-soluble dye complex with at least one surfactant out of anionic surfactant, non-ionic surfactant, amphoteric surfactant in anionic form.

50 Fatty acid alkohols including any derivatives thereof with at least one surfactant out of anionic surfactant, non-ionic surfactant, amphoteric surfactant in anionic form.

51 Fatty acid esters including any derivatives thereof, oil-soluble dye complex with at least one surfactant out of anionic surfactant, non-ionic surfactant, amphoteric surfactant in anionic form.

52 Fatty acid esters including any derivatives thereof, with at least one surfactant out of anionic surfactant, non-ionic surfactant, amphoteric surfactant in anionic form.

53 Fatty acid alkanol amides including any derivative thereof, oil-soluble dye complex with at least one surfactant out of anionic surfactant, non-ionic surfactant, amphoteric surfactant in anionic form.

54 Fatty acid alkanol amides including any derivative thereof, with at least one surfactant out of anionic surfactant, non-ionic surfactant, amphoteric surfactant in anionic form.

55 Fatty acid amides including any derivatives thereof, oil-soluble dye complex with at least one surfactant out of anionic surfactant, non-ionic surfactant, amphoteric surfactant in anionic form.

56 Fatty acid amides including any derivatives thereof, with at least one surfactant out of anionic surfactant, non-ionic surfactant, amphoteric surfactant in anionic form.

57 Fatty alcohol including any derivatives thereof, fatty acid esters including any derivatives thereof, fatty acid amides including any derivatives thereof, fatty acid alkanol amides including any derivative thereof, fatty acid amines including any derivatives thereof, fatty acid amineoxides including any derivatives thereof, with at least one surfactant out of cationic surfactant, non-ionic surfactant, or amphoteric surfactant in cationic form.

58 Fatty alcohol including any derivatives thereof, fatty acid esters including any derivatives thereof, fatty acid amides including any derivatives thereof, fatty acid amines including any derivatives thereof, fatty acid amineoxides including any derivatives thereof, with at least one surfactant out of cationic surfactant, non-ionic surfactant, or amphoteric surfactant in cationic form.

59 Fatty alcohol including any derivatives thereof, fatty acid esters including any derivatives thereof, fatty acid alkanol amides including any derivative thereof, fatty acid amines including any derivatives thereof, fatty acid amineoxides including any derivatives thereof, with at least one surfactant out of cationic surfactant, non-ionic surfactant, or amphoteric surfactant in cationic form.

60 Fatty alcohol including any derivatives thereof, fatty acid esters including any derivatives thereof, fatty acid amines including any derivatives thereof, fatty acid amineoxides including any derivatives thereof, with at least one surfactant out of cationic surfactant, non-ionic surfactant, or amphoteric surfactant in cationic form.

61 Fatty alcohol including any derivatives thereof, fatty acid esters including any derivatives thereof, fatty acid amides including any derivatives thereof, fatty acid alkanol amides including any derivative thereof, fatty acid amineoxides including any derivatives thereof, with at least one surfactant out of cationic surfactant, non-ionic surfactant, or amphoteric surfactant in cationic form.

62 Fatty alcohol including any derivatives thereof, fatty acid esters including any derivatives thereof, fatty acid amides including any derivatives thereof, fatty acid alkanol amides including any derivative thereof, fatty acid amines including any derivatives thereof, with at least one surfactant out of cationic surfactant, non-ionic surfactant, or amphoteric surfactant in cationic form.

63 Fatty acid esters including any derivatives thereof, fatty acid amides including any derivatives thereof, fatty acid alkanol amides including any derivative thereof, fatty acid amines including any derivatives thereof, fatty acid amineoxides including any derivatives thereof, with at least one surfactant out of cationic surfactant, non-ionic surfactant, or amphoteric surfactant in cationic form.

64 Fatty alcohol including any derivatives thereof fatty acid amides including any derivatives thereof, fatty acid alkanol amides including any derivative thereof, fatty acid amines including any derivatives thereof, fatty acid amineoxides including any derivatives thereof, with at least one surfactant out of cationic surfactant, non-ionic surfactant, or amphoteric surfactant in cationic form.

65 Fatty alcohol including any derivatives thereof, fatty acid esters including any derivatives thereof, fatty acid amides including any derivatives thereof, fatty acid alkanol amides including any derivative thereof, with at least one surfactant out of cationic surfactant, non-ionic surfactant, or amphoteric surfactant in cationic form.

66 Fatty alcohol including any derivatives thereof, fatty acid esters including any derivatives thereof, fatty acid amides including any derivatives thereof, with at least one surfactant out of cationic surfactant, non-ionic surfactant, or amphoteric surfactant in cationic form.

67 Fatty alcohol including any derivatives thereof, fatty acid esters including any derivatives thereof, fatty acid alkanol amides including any derivative thereof, with at least one surfactant out of cationic surfactant, non-ionic surfactant, or amphoteric surfactant in cationic form.

68 Fatty acid amides including any derivatives thereof, fatty acid alkanol amides including any derivative thereof, fatty acid amines including any derivatives thereof, fatty acid aminoxides including any derivatives thereof, with at least one surfactant out of cationic surfactant, non-ionic surfactant, or amphoteric surfactant in cationic form.

69 Fatty alcohol including any derivatives thereof, fatty acid esters including any derivatives thereof, with at least one surfactant out of cationic surfactant, non-ionic surfactant, or amphoteric surfactant in cationic form.

70 Fatty alcohol including any derivatives thereof, fatty acid amides including any derivatives thereof, fatty acid amines including any derivatives thereof, fatty acid amineoxides including any derivatives thereof, with at least one surfactant out of cationic surfactant, non-ionic surfactant, or amphoteric surfactant in cationic form.

71 Fatty alcohol including any derivatives thereof fatty acid alkanol amides including any derivative thereof, fatty acid amines including any derivatives thereof, fatty acid amineoxides including any derivatives thereof, with at least one surfactant out of cationic surfactant, non-ionic surfactant, or amphoteric surfactant in cationic form.

72 Fatty alcohol including any derivatives thereof, fatty acid amides including any derivatives thereof, fatty acid arnineoxides including any derivatives thereof, with at least one surfactant out of cationic surfactant, non-ionic surfactant, or amphoteric surfactant in cationic form.

73 Fatty alcohol including any derivatives thereof, fatty acid alkanol amides including any derivative thereof, fatty acid amines including any derivatives thereof, with at least one surfactant out of cationic surfactant, non-ionic surfactant, or amphoteric surfactant in cationic form.

74 Fatty alcohol including any derivatives thereof, with at least one surfactant out of cationic surfactant, non-ionic surfactant or amphoteric surfactant in cationic form.

75 Fatty alcohol including any derivatives thereof, fatty acid esters including any derivatives thereof with at least one surfactant out of cationic surfactant, non-ionic surfactant, or amphoteric surfactant in cationic form.

The amount of surfactant to be used depends on the quality of the oil phase, the co-emulsifier phase and the aqueous phase. Based on the guidance provided by the present invention, those skilled in the art will be able to formulate a good and optimal product with desired structure, performance, stability, production and emulsion properties. Generally, the amount of the surfactant required depends on the emulsifying power of the component and the balance of affinity for the oil phase and water phase.

It has been found for the low VOC formulations of this invention that water continuous systems generally are optimally emulsified with anionic surfactants, then cationic surfactants, then amphoteric surfactants and then non-ionic surfactants. This means the amount of surfactant needed to get optimal water continuous emulsions of a given oil phase, water phase, and co-emulsifier blend increases in the order anionic surfactant, cationic surfactant, amphoteric surfactant, non-ionic surfactant.

It has been found for a low VOC formulation according to this invention that oil continuous systems generally are optimally emulsified with non-ionic surfactants and anionic surfactants preferably with a crystallisation point below 50° C. Still more preferably with a crystallisation point below 40° C., still more preferably with a crystallisation point below 30° C., still more preferably with a crystallisation point below 20° C.

Anionic, cationic, non-ionic or amphoteric surfactant can be used singularly. Preferably a mixture of at least two surfactants is used together with the co-emulsifier. It has been found that mixtures of surfactants provide for good structure properties of low VOC formulations.

Preferably, the fatty acids used to form an anionic surfactant with suitable neutralising agent have from 1 to 70 carbon atoms, more preferably from 16 to 50 carbon atoms, still more preferably 16-40 carbon atoms.

Non-restrictive, specific examples are beeswax acid, C10-C40 hydroxyalkyl acid, C10-C40 isoalkylacid, coconut acid, corn acid, hydrogenated tallow acid, hydrogenated coconut acid, hydrogenated palm acid, hydroxystearic acid, isostearic acid, linseed acid, rice bran acid, palm acid, palm kernel acid, tall oil acid, tallow acid, undecanoic acid, undecylenic acid, myristic acid, palmitic acid, oleic acid, stearic acid, behenic acid, linoleic acid, montanic acid, C18-36 acid, C20-40 acid, C29-70 acid, C30-50 acid, C40-60 acid. Preferred is a combination of any of the following acids; palmitic acid, oleic acid, stearic acid, montanic acid, Licowax S, Licowax LP, Licowax SW and mixtures thereof. Licowax is a registered trademark of Clariant, Germany. The preferred acids are advantageous because of efficient viscosity building and good adhesion properties in combination with the neutralisation ingredients. The amount of acids used preferably is in excess over the amount of neutralising cation or ae.

Non-restrictive examples of neutralising agents that can be used for these fatty acids are for example lithium hydroxide, potassium hydroxide, sodium hydroxide, ammonia, triethanolamine, diethylethanolamine, dimethylethanol amine, aminomethyl propanol, diethanolamine, diisopropanol amine, dimethylamino methylpropanol, ethanolamine, isopropanolamine, methylethanaolamine, triisopropanol amine. Most preferred agents are sodium hydroxide, diethylethanolamine and aminomethyl propanol.

Non-restrictive example anionic surfactants that can be used are:

Soaps like Ammonium Isostearate, Ammonium Oleate, Ammonium Stearate, Ammonium Tallate, DEA-Isostearate, Potassium Behenate, Potassium Castorate, Potassium Hydrogenated Palmate, Potassium Hydrogenated Tallowate, Potassium Hydroxystearate, Potassium Isostearate, Potassium Stearate, Sodium Behenate, Sodium Castorate, Sodium Hydrogenated Palmate, Sodium Hydrogenated Tallowate, Sodium Hydroxystearate, Sodium Isostearate, Sodium Stearate, Sodium Tallate, Sodium Tallowate, TEA-Oleate, TEA-Palmitate, TEA_Tallate, TEA-Stearate;

Alkyl Sulfates like for example Sodium C12-13 Alkyl Sulfate, Sodium C12-15 Alkyl Sulfate, Sodium C12-18 Alkyl Sulfate, Sodium C16-18 Alkyl Sulfate, Sodium Oleyl Sulfate, Sodium Stearyl Sulfate, Sodium Cestearyl sulfate;

Alkyl Ether Sulfates like for example Sodium Laureth Sulfate, Sodium Laureth-5 Sulfate;

Alkyl Aryl Sulfonates like for example Sodium Dodecylbenzene-sulfonate, Sodium Tridecylbenzene sulfonate;

Phosphates based anionic surfactants like for example Disodium Oleyl Phosphate, Sodium Dihydroxycetyl Phosphate, Sodium Diceteareth-10 Phosphate, Sodium Steareth-4 Phosphate;

Sulfonic Acids like for example Sodium C13-17 Alkane Sulfonate, Sodium C14-18 Alkane Sulfonate, Sodium C16-18 Olefin Sulfonate;

Sulfosuccinates like for example Disodium Cetearyl Sulfosuccinate, Disodium Stearyl Sulfosuccinate, Disodium Oleyl Sulfosuccinate;

Sulfosuccinamates like for example Disodium Stearyl Sulfosuccinamate, Disodium Tallow Sulfosuccinamate;

Sarcosinates and sarcosine derivatives like for example Ammonium Cocoyl Sarcosinate, Ammonium Lauroyl Sarcosinate, Oleyl Sarcosine, Sodium Myristoyl Sarcosinate, Sodium Palmitoyl Sarcosinate, Stearoyl Sarcosine, TEA-Oleoyl Sarcosinate, TEA-Palm Kernel Sarcosinate.

Non-restrictive examples of nonionic surfactants that can be used are alkoxylated fatty alcohols, alkoxylated amides, alkoxylated amines, alkoxylated carboxylic acids, alkoxylated fatty acid esters, alkoxylated fatty acid amides, alkoxylated amine oxides or any derivatives of the afore mentioned materials all with an HLB value higher than 11, preferably higher than 12, still more preferably higher than 13 most preferably higher then 14. Examples include compounds or mixtures comprising primary even and/or uneven, linear and/or branched, saturated and/or unsaturated, alpha or beta functionalised carbon chains with a total number of carbon atoms ranging from C7-50 preferably C7-36, more preferably C10-28, still more preferably C10-22, still more preferably C10-18, most preferably C16-18 per molecule reacted to the appropriate amount of ethylene oxide and/or propylene oxide to achieve the preferred HLB. Non-restrictive examples nonionics are C13-15 Oxoalcohol+7EO, C13-15 Oxoalcohol+11EO, Ceteth-7, Ceteth-10, Ceteth-12, Ceteareth-8, Ceteareth-10, Steareth-8, Steareth-10, Lutensol AT 13 of BASF Germany, PEG-6 Cocamide, PEG-11 Cocamide, PEG-6 Lauramide, PEG-9 Oleamide, PEG-8 Tallow Amide, PEG-15 Stearamide, PEG-9 Stearamide Carboxylic Acid, PEG-10 Cocamine, PEG-6 Oleamine, PEG-8 Hydrogenated Tallow Amine, PEG-11 Tallow Amine, PEG-10 Soyamine, PEG-15 Soyamine, PEG-10 Stearamine, PEG-8 Cocoate, PEG-10 Lanolate, PEG-12 Oleate, PEG-14 Oleate, PEG-14 Stearate, PEG-14 Tallate, Glycereth-5 Cocoate, PEG-20 Castoroil, PEG 10 Glyceryl Stearate, PEG 15 Glyceryl Stearate, Polysorbate 20, Polysorbate 21, Polysorbate 40, Polysorbate 60, Polysorbate 61, Polysorbate 65, Polysorbate 80, Polysorbate 81, Polysorbate 85, PEG-6 Sorbitan Oleate, PEG-6 Sorbitan Stearate.

Non-restrictive examples of cationic surfactants that can be used are Behenalkonium Chloride, Behentrimonium Chloride, Behenamidopropyl Ethyldimonium Ethosulfate, Behentrimonium Methosulfate, C12-18 Dialkyldimonium Chloride, Cetalkonium Bromide, Cetearalkonium Bromide, Ceteationium Chloride, Cetethyldimonium Bromide, Cetrimonium Bromide, Cetrimonium Chloride, Cetrimonlium Tosylate, C18-22 Isoalkylamidopropylethyldimonium Ethosulfate, Cocotrimonium Chloride, Di-C14-18 Alkyl Dimonium Chloride, Dicocodimonium Chloride, Dihydrogenated Tallow Benzylmonium Chloride, Dipalmitoylethyl Dimronium Chloride, Distearoylethyl Dimonium Chloride, Distearyldimonium Chloride, Hydrogenated Tallowalkonium Chloride, Olealkonium Chloride, Steartrimonium Chloride, Tallowalkonium Chloride, Tallowtrimonium Chloride.

Non-restrictive examples of amphoteric surfactants that can be used are Dihydroxy Stearyl Glycinate, Dihydroxy Tallow Glycinate, Disodium Steariminodipropionate, Disodium Tallowiminodipropionate, Sodium Carboxyethyl Tallow Polypropylamine, Behenyl Betaine, Cetyl Betaine, Stearyl Betaine, Tallow Betaine, Hydrogenated Tallow Betaine Oleyl Betaine, Stearamidopropyl Betaine.

Preferably the surfactant is used in amounts of 0.2-10% by weight of the total product, more preferably 0.5-8% by weight of the total product, most preferably 0.5-7% by weight of the total product depending on its character and effect.

Preferred blends are combinations of anionic surfactants, combinations of anionic and non-ionic surfactants, combinations of cationic surfactants, combinations of cationic and non ionic surfactants.

Preferred combinations of raw materials mostly use neutralised fatty acid as a base with an auxiliary amount of other surfactant.

Most preferred surfactants are chosen from, neutralised stearic acid in combination with montan acid wax, Sodium Stearyl Sulfate, Sodium Laureth Sulfate, Sodium Dodecylbenzenesulfonate, Disodium Stearyl Sulfosuccinate, Steareth-10, Lutensol AT 13, PEG-8 Tallow Amide, PEG-15 Stearamide, PEG-8 Hydrogenated Tallow Amine, PEG-11 Tallow Amine, PEG-14 Stearate, PEG-14 Tallate, PEG 10 Glyceryl Stearate, PEG 15 Glyceryl Stearate, Polysorbate 20, Polysorbate 40, Polysorbate 60, Cetrimonium Bromide, Distearyldimonium Chloride, Hydrogenated Tallowalkonium Chloride.

The co-emulsifier can comprise one or more compounds chosen from several categories. These are carboxylic acids and neutralising agents or salts which either are reacted in situ during the production process or added as neat multivalent metal soaps, fatty alcohols, alkoxylated fatty alcohols, alkoxylated amides, alkoxylated amines, alkoxylated carboxylic acids, fatty acid esters, fatty acid amides, alkanol amides, fatty acid amines, and amine oxides or any derivatives of the afore mentioned materials.

Suitable carboxylic acids include organic acids, organic diacids, organic hydroxy acids, organic dihydroxy acids, organic hydroxy diacids, organic dihydroxy diacids, organic multihydroxy acids, organic multihydroxy multiacids and anhydrides thereof. Preferably, these acids or anhydrides thereof have from 1 to 70 carbon atoms, more preferably from 1 to 12 and from 16 to 50 carbon atoms.

Non-restrictive specific examples are abietic acid, arachidic acid, beeswax acid, C10-40 hydroxyalkyl acid, C10-40 Isoalkylacid, coconut acid, corn acid, hydrogenated tallow acid, hydrogenated coconut acid, hydrogenated palm acid, hydroxystearic acid, isostearic acid, linseed acid, rice bran acid, palm acid, palm kernel acid, tall oil acid, tallow acid, undecanoic acid, undecylenic acid, formic acid, acetic acid, oxalic acid, citric acid, lactic acid, aspatic acid, glutamic acid, succinic acid, sorbic acid, tartaric acid, adipic acid, capric acid, caprilic acid, myristic acid, palmitic acid, oleic acid, stearic acid, behenic acid, linoleic acid, montanic acid, C18-36 acid, C20-40 acid, C29-70 acid, C30-50 acid, C40-60 acid, crotonic acid, hydroxycapric acid, hydroxylauric acid, laureth-3 carboxylic acid, maleic acid and the like. Preferred is a combination of any of the following acids: formic acid, lactic acid, succinic acid, palmitic acid, oleic acid, stearic acid, montanic acid, Licowax S. Licowax LP, Licowax SW and mixtures thereof. Licowax is a registered trademark of Clariant, Germany. The preferred acids are advantageous because of efficient viscosity building and good adhesion properties in combination with the neutralization ingredients and salts mentioned below. The amount of acids used preferably is in excess over the amount of neutralising multivalent cation or multivalent amine.

If present, preferably the carboxylic acids having less then 12 carbon atoms are used in typical amounts of 0.05-2 weight % based on the weight of the total product, more preferred is 0.1-1.75% by weight based on the weight of the total product, still more preferred is 0.10-1.50% by weight based on the weight of the total product, a still more preferred amount is 0.10-1.25% by weight A neutralising agent or salt may be present in an amount of 0.05-10% by weight based on the weight of the total product. Suitable neutralising agents may be chosen from:

1 The class of any organic amine or any derivatives thereof having more than one of primary and/or secondary and/or tertiary and/or quaternary amine functionalities which react to the above mentioned carboxylic acids to a multivalent amine soap. Non-restrictive examples are arginine, asparagine, glutamine, histidine, lysine, tryptophan, pentaethylenehexylamine, triethylenetetraamine, diethylenetriamine, ethylenediamine, aminoethylethanolamine, primene MD (available from Rohm and Haas company, Germany), neopentanediamine, 1,3-diamino propane, N,N, N',N'-tetramethyl-1,3-propanediaamine and 1,4-butanediamine, particularly preferred are 1,3-propanediamine and 1,4-butanediamine and neopentanediamine. These molecules are used in such concentrations that the total amount of amine groups, when expressed in equivalents mg KOH/gram, ranges from 0.25-20 mg KOH/gram in the shoe care product, preferably 0.50-15 mg KOH/gram in the shoe care product, still more preferably 0.75-12.5 mg KOH/gram in the shoe care product, still more preferably 1.25-10 mg KOH/gram in the shoe care product. The amount of amine groups in mg KOH/gram product is calculated in the following way: (Percentage of the pure amine used in the product times number of amine groups times 56100) divided by (molecular weight of the amine times 100).

2 The class of any metal multivalent cations having a charge of 2+ or 3+ added in the form of an oxide or a hydroxide or an organic salt or an inorganic salt which react to the above mentioned carboxylic acids to a multivalent metal acid soap. These cations are used in such concentrations that the total amount of cations when expressed in equivalents mg KOH/gram ranges from 0.25-20 mg KOH/gram in the shoe care product, preferably 0.50-15 mg KOH/gram in the shoe care product, still more preferably 0.85-12.5 mg KOH/gram in the shoe care product, still more preferably 1.0-10 mg KOH/gram in the shoe care product, still more preferably 1.15-9 mg KOH/gram in the shoe care product, still more preferably 1.3-8 mg KOH/gram in the shoe care product, still more preferably 1.45-7.5 mg KOH/gram in the shoe care product, still more preferably 1.60-7.5 mg KOH/gram in the shoe care product. The amount of cation in mg KOHL gram product is calculated in the following way: (Percentage of the pure cation used in the product times the valency of the cation times 56100) divided by (atomic weight of the cation times 100)

Preferred metals are aluminium, calcium, magnesium, barium, chromium, manganese, iron, cobalt, copper, zinc. Most preferred are aluminium, calcium, magnesium, and zinc, particularly preferred are calcium and magnesium.

Alternatively 0-10% multivalent metal soap constituted of any of the metal cations and acids mentioned above can be added. Non-restrictive examples are calciumstearate, calciumlaurate, calciumarachinate, zincstearate, zirclaurate, zincarachinate, magnesiumstearate, aluminumstearate Fatty Alcohols comprising a mixture of primary or secondary, even and/or uneven, linear and/or branched, saturated and/or unsaturated fatty alcohols, alpha or beta hydroxylated, with a total carbon content ranging from C8-50 preferably C10-36, more preferably C12-28, still more preferably C14-22, still more preferable C16-22 and most preferable C16-18. It was found that the preferred agents provide low VOC formulations with efficient viscosity building and desirable adhesion properties Alkoxylated Fatty alcohols, Alkoxylated Amides, Alkoxylated Amines, Alkoxylated carboxylic acids all with an HLB value below 13, more preferably below 12, still more preferably below 11, still more preferably below 10, still more preferably below 9, still more preferably below 8. Examples include compounds or mixtures comprising primary even and/or uneven, linear and/or branched, saturated and/or unsaturated, alpha or beta functionalised carbon chains with a total number of carbon atoms ranging from C7-50 preferably C7-36, more preferably C8-28, still more preferably C8-22, still most preferably C8-18 per molecule reacted to the appropriate amount of ethylene oxide and/or propylene oxide to achieve the preferred HLB. HLB determination methods are described in W. C. Griffin Calculation of HLB Values of Nonionic Surfactants, J. Soc Cosmetic Chemists 5 (No.4), 249-55 (1954) and The HLB System, a timesaving guide to emulsifier selection, ICI Americas, ICI Surfactants, Wilmington, Del., 19887, revised may 1992, 51-0010-303 15M.

Preferred examples are C13-15 Oxoalcohol+2EO, C13-15 Oxoalcohol+3EO, Ceteth-2, Ceteth-3, Ceteth-4, Ceteareth-2, Ceteareth-3, Ceteareth-4, Steareth-2, Steareth-3, Steareth-4, PEG-2 Cocamide, PEG-3 Cocamide, PEG-3 Lauramide, PEG-3 Oleamide, PEG-4 Rapeseedamide, PEG-4 Tallow Amide, PEG-4 Stearamide, PEG-2 Stearamide Carboxylic Acid, PPG-2 Cocamide, PEG-2 Cocamine, PEG-3 Cocamine, PEG-2 Lauramine, PEG-3 Oleamine, PEG-2 Rapeseedamine, PEG-5 Hydrogenated Tallow Amine, PEG-2 Tallow Amine, PEG-2 Soyamine, PEG-5 Soyamine, PEG-4 Stearamine, PEG-2 Stearamine Carboxylic Acid, PEG-2 Cocamine, PEG-3 Cocoate, PEG-2 Ethylhexanoate, PEG-2 Isononnanoate, PEG-2 Laurate, PEG-3 Isostearate, PEG-3 Lanolate, PEG-2 Laurate, PEG-2 Oleate, PEG-2 Oleate, PEG-4 Olivate, PEG-2 Stearate, PEG-4 Tallate. It was found that the preferred agents provide low VOC formulations with efficient viscosity building and desirable adhesion properties.

Esters comprising esters of an acid and an alcohol and any derivatives thereof including but not limited to e.g. alkoxylated or acetylated esters of fatty acid and alcohol, esters of fatty acid and polyglyceryl alcohols the so called polyglyceryl esters, sorbitan esters and derivatives, phosphorus esters, and waxes all with an HLB value below 13, more preferably below 12, still more preferably below 11 still more preferably below 10, still more preferably below 9, still more preferably below 8 comprising a mixture of primary even and/or uneven, linear and/or branched, saturated and/or unsaturated, alpha or beta functionalised acidic carbon chains with a total carbon content ranging from C1-50 preferably C1-C36, more preferably C1-C28, still more preferably C1-C22, still most preferable C1-C18 per molecule reacted to any alcohol and optionally the appropriate amount of ethylene oxide and/or propylene oxide comprising reaction products to achieve the preferred HLB.

Non-restrictive Apples of the acid include organic acids having 1-70 carbon atoms, organic diacids having 3-70 carbon atoms, organic hydroxy acids having 2-70 carbon atoms, organic dihydroxy acids having 2-70 carbon atoms, organic dihydroxy diacids having 3-70 carbon atoms, organic multihydroxy acids having 2-70 carbon atoms, organic multihydroxy multiacids having 4-70 carbon atoms with any alcohol.

Any alcohol may comprise a mixture of primary or secondary, even and/or uneven, linear and/or branched, saturated and/or unsaturated fatty alcohols, alpha or beta hydroxylated, with a total carbon content ranging from C1-50 preferably C1-36, more preferably C1-28, still more preferably C1-22, still more preferable C1-22 and most preferable C1-18. Examples are mono, di, trio tetra, penta, hexa or multi functional alcohols e.g. ethylene glycol, ethanol, glycerol, sorbitan, sorbitol, propanediol, sucrose, glucose, butylene glycol, poly glycerin, pentaerythreitol, cetyl alcohol, oleyl alcohol, stearyl alcohol, cholesterol, behenyl alcohol, alcohols from wool fat, alcohols from beeswax, alcohols from crude montan wax. Particularly preferred alcohols are glycerol, sorbitol, glucose and sucrose.

A non-restrictive range of examples of acids are abietic acid, arachidic acid, beeswax acid, C10-40 hydroxyalkyl acid, C10-40 Isoalkylacid, coconut acid, corn acid, hydrogenated tallow acid, hydrogenated coconut acid, hydrogenated palm acid, hydroxystearic acid, isostearic acid, linseed acid, Rice Bran Acid, Palm Acid, Palm Kernel Acid, Tall Oil Acid, Tallow acid, Undecanoic acid, Undecylenic acid, capric acid, caprilic acid, myristic acid, palmitic acid, oleic acid, stearic acid, behenic acid, linoleic acid, montanic acid, C18-36 acid, C20-40 acid, C29-70 acid, C30-50 acid, C40-

60 acid, hydroxycapric acid, hydroxylauric acid, laureth-3 Carboxylic Acid, and the like. Most preferred are palmitic acid, oleic acid, stearic acid and montanic acid, Licowax S, Licowax LP, Licowax SW and mixtures of all or part of the afore going most preferred agents. Particularly preferred are esters of palmitic acid, oleic acid and stearic acid and Licowax S and mixtures thereof. Licowax is a registered trademark from Clariant, Germany The ester also can be available in the form of alkoxylation products from nature-derived raw materials. Non-restrictive examples are wool fat, bees wax, castor oil, soy oil, hydrogenated castor oil, crude montan wax.

Further non-restrictive examples comprise Laneth 5, PEG-3 Lanolate, Lanosterol, Cetylphosphate, Ceteareth-2 Phosphate, Lecithin, Oleth-2 Phosphate, Steareth-3 Phosphate. Sorbitan Caprylate, Sorbitan Cocoate, Sorbitan Diisostearate, Sorbitan Dioleate, Sorbitan Distearate, Sorbitan Isostearate, Sorbitan Laurate, Sorbitan Oleate, Sorbitan Olivate, Sorbitan Palmitate, Sorbitan Sesquiisostearate, Sorbitan Sesquioleate, Sorbitan Sesquistearate, Sorbitan Stearate, Sorbitan Triisostearate, Sorbitan Trioleate, Sorbitan Tristearate.

It was found that the preferred agents provide low VOC formulations with efficient viscosity building and regulation of solvent evaporation properties.

Amides or fatty acid amides and any derivatives thereof including but not limited to alkoxylated fatty acid amides and alkanolamides all with an HLB value below 13, more preferably below 12, still more preferably below 11 still more preferably below 10, still more preferably below 9, still more preferably below 8 comprising a mixture of primary or secondary, even and/or uneven, linear and/or branched, saturated and/or unsaturated amide with a total carbon content ranging from C8-50, preferably C10-36, more preferably C12-28, still more preferably C14-22, still more preferable C16-22, and most preferable C16-18. Preferred examples are stearamide, oleamide, erucamide, oleyl palmitamaide, stearylerucaride, ethylene-bis-stearamide, ethylene-bis-olemide, behenamide, cocamide, hydrogenated tallowamide, lauramide, linoleamide, oleamide, tallow amide, behenamide DEA, Behenamide DEA, hydrogenated tallowamide DEA, Hydroxyethylstearamide MIPA, Isostearamide DEA, Stearamide DEA, Stearamide USA, Tallowamide DEA, most preferred is stearamide.

Amines or fatty acid amines and any derivatives thereof including but not limited to alkoxylated fatty acid amines all with an HLB value below 13, more preferably below 12, still more preferably below 11 still more preferably below 10, still more preferably below 9, still more preferably below 8 comprising a mixture of primary or secondary, tertiary or quaternary, even and/or uneven, linear and/or branched, saturated and/or unsaturated amine with a total carbon content ranging from C8-50 preferably C10-36, more preferably C12-28, still more preferably C14-22, still more preferable C16-22 and most preferable C16-18. Non-restrictive examples of preferred agents are dicomine, dimethyl lauramie, hydrogenated tallow amine, oleamie, stearamine, soyamine. It was found that the preferred agents provide low VOC formulations with efficient viscosity building and desirable adhesion properties.

Amine Oxides and/or fatty acid amineoxides and any derivatives thereof including but not limited to alkoxylated fatty acid amine oxides all with an HLB value below 13, more preferably below 12, still more preferably below 11 still more preferably below 10, still more preferably below 9, still more preferably below 8 comprising a mixture of even and/or uneven, linear and/or branched, saturated and/or unsaturated amine oxide with a total carbon content ranging from C8-50 preferably C10-36, more preferably C12-28, still more preferably C14-22, still more preferable C16-22 and most preferable C16-18. Non-restrictive examples of preferred agents are stearamine oxide, oleamine oxide, lauramine oxide, oleamine oxide, behenamine oxide, pamitamine oxide, cocamineoxide, hydrogenated tallowamine oxide, tallow amine oxide most preferred is stearamine oxide. It was found that the preferred agents provide low VOC formulations with efficient viscosity building and desirable adhesion properties.

Oil-soluble dye complex is formed by reacting fatty acid, for example oleic acid or stearic acid, to basic dye stuffs, for example rhodamine, chrysodine, nigrosine.

The co-emulsifier composition must be compatible with the surfactant of the low VOC formulation. Preferred co-emulsifier combinations have been described above in extensive summary.

Preferably for water continuous emulsion systems in general at least two, preferably at least three raw material classes are chosen from the possible co-emulsifier raw materials classes:

One may be chosen from the fatty acid soaps of multivalent cations or multivalent amines of which it was found that they provide for improved product structure properties of low VOC formulations. Preferred amounts range from 0.5-16% by weight, more preferred from 0.5-10 wt. %., and still more preferred from 0.5-8 wt. %.

One or two may be chosen from the classes of fatty acid, fatty alcohol and fatty acid ester or any derivatives thereof which provide for improved product structure, application and storage stability properties of low VOC formulations. Preferred amounts range from 0.5-10 wt. %, and more preferred 0.5-9 wt. %, more preferred 0.5-7 wt. %.

One may be chosen from the classes from fatty acid amide, fatty acid amine, fatty acid amine oxide or any derivatives there of, of which it was found they provide for improved product structure, and adhesion properties of low VOC formulations. Preferred amounts range from 0.5-10 wt. %, more preferred from 0.5-7 wt. %, more preferred from 0.5-5 wt. %.

Preferably for oil continuous emulsion systems in general at least one raw material class is chosen from the co-emulsifer raw materials classes. Preferably this co-emulsifier raw material shows non-ionic or anionic character in use. Preferred amounts range from 0.5-10 wt. %, more preferred from 0.5-7 wt. %, and still more preferred from 0.5-5 wt. %.

Depending on the leather surface to be treated, the climate (relative humidity and prevailing temperature profile) the product will be used in, the quality of the packaging, the product properties that have to stand out a mixture of these raw material classes is chosen.

More preferably the co-emulsifier raw material classes consist of a selection of combinations of raw material described extensively above for the co-emulsifier phase derived from alkyl chains having 16, 18 and 16-36 carbon atoms like palmitic acid, cetyl alcohol, stearic acid, stearyl alcohol and montan acid wax.

Any combination is possible within the limits described in this invention. Preferably the co-emulsifier is used in amounts of 0.2-16% by weight of the total product, more preferably 0.5-13% by weight of the total product, most preferably 1-10% by weight of the total product.

A shoe care product according to the invention can be prepared by mixing the appropriate ingredients in the appropriate amounts. The preparation method involves heating the oil phase to 80-140° C. until all components are molten and fully and homogenously dissolved, heating the water phase to a temperature of 60-100° C. and slowly adding the oil into the water phase (preferred mode for water continuous emulsion systems) or the water into the oil phase (preferred mode for oil continuous emulsion systems) while mixing. Shear energy is put into the into vessel until the emulsion is homogenously mixed at temperatures of 95-100° C. Optional ingredients can be added before cooling or after reaching 80° C. To speed up cooling part of the water can be added after emulsion formation.

Monovalent and multivalent cations, if present, are typically added to the aqueous phase, but can also be added to the oil phase. Multivalent cations are added to the water phase only after the emulsion has formed. Usually after 5-15 minutes. After adding multivalent cations the metal soaps are formed during 5-30 minutes of additional mixing at 95-100° C. minutes. Monovalent and multivalent amines, if present, may be added either to the oil phase or to the aqueous phase.

A shoe care product according to the invention can be used in any conventional way for treating or cleaning shoes or other footwear or other leather products.

Typically, a method for cleaning or treating shoes employing a shoe care product according to the invention involves applying the product with an applicator surface comprising a brush and/or woven textile cloth and/or sponge and/or non-woven material and/or the product itself in stick form (like deodorant sticks). The materials used for these applicator surfaces can be manufactured from any suitable source be it from plant, animal or man-made synthetic origin.

Subsequently after drying the product will be buffed with a buffing surface comprising a brush and/or woven textile cloth and/or sponge and/or non-woven material and/or panty materials. The materials used for these brushing surfaces can be manufactured from any suitable source be it from plant, animal or man-made synthetic origin. Usually the initial buffing materials are stir and the after buff, the finishing touch is given with a soft cloth.

Preferred method of use is to apply with a brush or a cloth, most preferably with a brush just to reach all corners and crevices and then to buff with a brush or cloth initially and finalise with a soft cloth.

The invention will now be elucidated by the following, non-restrictive examples.

EXAMPLE I

A shoe care product was prepared by mixing the following ingredients in percentages by weight according to the manufacturing procedure below:

| TerHell Paraffin 4110 | 8.00 | Sasolwax, Germany |
| --- | --- | --- |
| Pristerene 4900 | 3.25 | Uniqema, Netherlands |
| Microflex M4 | 3.00 | Luzatto & Figlio, France |
| Licowax E | 1.50 | Clariant, Germany |
| Licowax S | 4.00 | Clariant, Germany |
| Carnauba Grise Grasse T4 | 1.22 | Fasting & Co., Netherlands |
| Montanwachs Romanta N | 0.91 | Romonta GmbH, Germany |
| Portugese gumrosin WW | 1.00 | Interensco NV, Belgium |

Code Romax

| Diethylaminoethanol | 2.10 | BASF, Germany |
| --- | --- | --- |
| Sodium Nitrite | 0.10 | BASF Corp., New Jersey |
| Sodium Benzoate | 0.10 | DSM, Netherlands |
| Proxel GXL | 0.20 | Avecia Limited, UK |
| Water, Demineralised | 66.32 | |

Premix I

| Water, demineralised | 7.50 | |
| --- | --- | --- |
| Ca(OH)2, Standard grade | 0.33 | Lhoist, France |
| Formic Acid (80% by weight) | 0.47 | Brenntag, Belgium |

Manufacturing Procedure:

Fill a small separate premix 1 vessel with 7.5% demineralised water, sprinkle in $Ca(OH)_2$, mix until homogeneous. Subsequently add Formic acid (80% by weight) under mixing.

Add the water to the mixing vessel. The water phase should reach a temperature of 95° C. at the same time as the wax phase reaches a temperature of 105° C. Add paraffin, pristerene 4900, Microflex M4 to the wax melting vessel and start melting at temperature of 100° C. When molten add Licowax E, Licowax S, Carnauba T4, Crude Montan, Romanta N. When molten add Portugese Gumrosin. Adjust temperature to 105° C. When both phases have attained their desired temperatures (105° C. for the wax and 95° C. for the water phase), add Diethyl ethanol amine to wax phase and mix for 2 minutes at 105° C. Then slowly add the wax phase into the water phase in such a manner that the wax is mixed directly into the water in the course of ten minutes. Keep temperature up at 95-98° C. and mix for 2 minutes. Slowly add the premix 1 to the mixing vessel and mix for 10 minutes at 95-98° C. Start cooling the polish. At 80° C. remove cooling water from the vessel jacket. Add sodium nitrite, Sodium benzoate and Proxel GXL to the polish. Filling temperature 70-75° C.

EXAMPLE II

A shoe care product was prepared by mixing the following ingredients in percentages by weight according to the manufacturing procedure below:

Water Phase

| Water, Demineralised | 70.79 | |
| --- | --- | --- |
| Sodium Nitrite | 0.10 | BASF Corp., New Jersey |
| Sodium Benzoate | 0.10 | DSM, Netherlands |
| Proxel GXL | 0.10 | Avecia Limited, UK |

Oil Phase

| Licowax FP371 | 1.00 | Clariant, Germany |
| --- | --- | --- |
| Microflex M4 | 1.00 | Luzatto & Figlio, France |
| Carnauba Grise Grasse T4 | 3.25 | Fasting & Co., Netherlands |
| Vestowax E 421 R | 0.75 | Degussa, Germany |
| Span 80 | 1.18 | Uniqema, Netherlands |
| Tween 81 | 1.23 | Uniqema, Netherlands |
| Isopar G | 3.50 | Exxon Mobil Chemical, USA |
| Isopar M | 3.00 | Exxon Mobil Chemical, USA |
| Priolene 6900 | 3.00 | Uniqema, Netherlands |
| Paraffin 52/54Z | 12.00 | H&R Wax Co. GmbH Salzbergen, Germany |

Manufacturing Procedure:

Add all the water to a water heating vessel(s). The water phase should reach a temperature of 98° C. at the same time as the oil phase reaches a temperature of 98° C.

Oil phase: Add pal 52/54Z, Carnauba T3, FP371, E 421 R, Microflex to the mixing vessel and start melting at temperature of 110° C. When molten add Span 80, Tween 81, Isopar M and Isopar G. Adjust temperature to 98° C. while mixing.

When both phases have attained their desired temperatures (98° C. for the oil and 98° C. for the water phase). Add Na-benzoate, NaNO2, and Proxel GXL to the water phase. When temperature of 98° C. is reached again keep for 2 mixtures at this.

Then slowly add, while mixing at maximum speed, the water phase into the wax phase in such a manner that the water is mixed directly into the wax phase. Keep temperature up at 95-98° C. and mix for 10 minutes.

Start cooling the polish while proceeding mixing at maximum speed. Remove cooling water from the vessel jacket at 75° C. Keep the temperature at 75° C. Filling temperature 68-73 C.

EXAMPLE III

A shoe care product was prepared by mixing the following ingredients in percentages by weight according to the manufacturing procedure below:

| Licowax S | 6 | Clariant Germany |
|---|---|---|
| Pristerene 4900 | 1.5 | Uniqema, Netherlands |
| Portugese gumrosin | 1.00 | Interensco NV, Belgium |

WW Code Romax

| Diethylethanolamine | 1 | BASF, Germany |
|---|---|---|
| Arlacel 186 | 1.42 | Uniqema, Netherlands |
| Tween 80 | 1.08 | Uniqema, Netherlands |
| Licowax E | 5 | Clariant Germany |
| Flexonyl Black PR 100 | 1.5 | Clariant Germany |
| Ethyleneglycol | 1 | Shell, Netherlands |
| Paraffin 68–70 | 8 | Total Solvants, France |
| Licowax RT | 1 | Clariant Germany |
| Licowax PED 521 | 1 | Clariant Germany |
| Carnauba Fatty Grey NC 3 | 2.5 | Fasting & Co, Netherlands |
| Proxel GXL | 0.20 | Avecia Limited, UK |
| Water, Demineralised | 68 | |

Manufacturing Procedure:

Heat all waxes, wood rosin and emulsifiers Paraffin 68-70, Licowax S, Licowax E, Pristerene 4900, Licowax RT, Licowax PED 521, Carnauba T3, Portugese Gumrosin WW, Arlacel 186, Tween 80 in wax melter and start mixing slowly as soon as about 50% of material is melted. Raise the temperature to 124-127° C. Heat the water phase contents in mixing kettle up to 91-93° C. while mixing: Water, Ethylene glycol, Flexonyl Black PR 100. The water phase should reach 91-93° C. about the same time as the wax phase reaches 124-127° C. When both phases have attained their desired temperatures, add Diethyl ethanol amine to wax phase and mix for 3 minutes. Add Proxel GXL to the water phase, mix for two minutes and then transfer the wax phase to the water phase in the mixing vessel. Carefully control wax pouring to prevent overheating and boiling water. Mix the emulsion for 5 minutes at 89-92° C., then cool to 82-85° C. and transfer to preheated filling kettle. Maintain temperature at 82-85° C. Transfer the product to preheated filling hopper, and fill in containers at 77-79° C.

EXAMPLE IV

A shoe care product was prepared by mixing the following ingredients in percentages by weight according to the manufacturing procedure below:

Water Phase

| Water, Demineralised | 70.80 | |
|---|---|---|
| Sodium Benzoate | 0.20 | DSM, Netherlands |
| Proxel GXL | 0.30 | Avecia Limited, UK |

Oil Phase

| Licowax FP371 | 0.60 | Clariant, Germany |
|---|---|---|
| Microflex M4 | 0.60 | Luzatto & Figlio, France |
| Carnauba Grise Grasse T4 | 4.15 | Fasting & Co., Netherlands |
| Span 80 | 1.60 | Uniqema, Netherlands |
| Tween 81 | 1.60 | Uniqema, Netherlands |
| Isopar G | 9.75 | Exxon Mobil Chemical, USA |
| Priolene 6900 | 3.00 | Uniqema, Netherlands |
| Paraffin 58–60 | 7.20 | Total Solvants, France |

Manufacturing Procedure:

Add all the water to a water heating vessel(s). The water phase should reach a temperature of 98° C. at the same time as the oil phase reaches a temperature of 98° C.

Oil phase: Add paraffin 58-60, Carnauba T3, FP371, Microflex to the mixing vessel and start melting at temperature of 110° C. When molten add Span 80, Tween 81, and Isopar G. Adjust temperature to 98° C. while mixing.

When both phases have attained their desired temperatures (98° C. for the oil and 98° C. for the water phase). Add Na-benzoate and Proxel GXL to the water phase. When temperature of 98° C. is reached again keep for 2 minutes at this.

Then slowly add, while mixing at maximum speed, the water phase into the wax phase in such a manner that the water is mixed directly into the wax phase. Keep temperature up at 95-98° C. and mix for 10 minutes.

Start cooling the polish while proceeding mixing at maximum speed. Remove cooling water from the vessel jacket at 75° C. Keep the temperature at 75° C. Filling temperature 68-73 CC.

EXAMPLE V

A shoe care product was prepared by mixing the following ingredients in percentages by weight according to the manufacturing procedure below:

Water Phase

| Water, demineralised | 64.7 | |
|---|---|---|
| KD Sperse Black EP880 | 1.00 | Holliday Dispersions Limited, UK |
| Proxel GXL | 0.10 | DSM, Netherlands |
| Sodium Benzoate | 0.20 | Avecia Limited, UK |

Oil Phase

| | | |
|---|---|---|
| Microflex 4M | 0.5 | Luzatto & Figlio, France |
| Licowax FP 371 | 1.8 | Clariant, Germany |
| Vybar 253 | 1.7 | Baker Petrolite Corporation |
| Paraflint C80 | 1.7 | Sasolwax, Germany |
| Paraflint H1 | 2.55 | Sasolwax, Germany |
| Paraffine 58/60 | 8.75 | Total Solvants, France |
| Tween 81 | 1.8 | Uniqema, Netherlands |
| Span 80 | 1.2 | Uniqema, Netherlands |
| Dow Corning 200 Fluid, 12500 cSt | 0.5 | Dow Corning Europe, Belgium |
| Priolene 6900 | 2.00 | Uniqema, Netherlands |
| Exxsol D60 | 11.5 | Esso Chemie Nederland, Netherlands |

Manufacturing Procedure:

Add all the water to a water heating vessel(s). The water phase should reach a temperature of 98° C. at the same time as the oil phase reaches a temperature of 98° C.

Oil phase: Add paraffin 58-60, Microflex 4M, Licowax FP 371, Vybar 258, Paraflint C80, Paraflint H1, Dow Corning 200 Fluid, 12500 cSt to the mixing vessel and start melting at temperature of 110° C. When molten add Span 80, Tween 81, and Exxsol D60. Adjust temperature to 98° C. while mixing.

When both phases have attained their desired temperatures (98° C. for the oil and 98° C. for the water phase). Add Na-benzoate, the carbon black dispersion and Proxel GXL to the water phase. When temperature of 98° C. is reached again keep for 2 minutes at this.

Then slowly add, while mixing at maximum speed, the water phase into the wax phase in such a manner that the water is mixed directly into the wax phase. Keep temperature up at 95-98° C. and mix for 10 minutes.

Start cooling the polish while proceeding mixing at max um speed. Remove cooling water from the vessel jacket at 75° C. Keep the temperature at 75° C. Filling temperature 68-73° C.

EXAMPLE VI

A shoe care product was prepared by mixing the following ingredients in percentages by weight according to the manufacturing procedure below:

| | | |
|---|---|---|
| Licowax S | 2.50 | Clariant, Germany |
| Pristerene 4900 | 1.05 | Uniqema, Netherlands |
| Priolene 6900 | 2.00 | Uniqema, Netherlands |
| Crodamide S | 2.55 | Croda Universal Limited, UK |
| Diethylethanolamine | 1.55 | BASF, Germany |
| $CaCl_2 \cdot 2H_2O$ | 0.30 | Merck, Germany |
| Paraflint AP5 | 3.60 | Sasolwax, Germany |
| Microflex M4 | 3.00 | Luzatto & Figlio, France |
| TerHell Paraffine 4110 | 8.00 | Sasolwax, Germany |
| Q8 Puccini 19P | 1.00 | Kuwait Petroleum N.V., Belgium |
| Proxel GXL | 0.22 | Avecia Limited, UK |
| Water, Demineralsed | 74.23 | |

Manufacturing Procedure:

Licowax S, Pristerene 4900, Priolene 6900, Crodamide S, Paraflint AP5, Microflex M4, TerHell Paraffin 4110, Q8 Puccini 19P are loaded into wax melting vessel, heated to 120-125° C. and stirred until homogeneous.

Demineralised water, calcium chloride are loaded into mixing vessel, heated to 95-100° C. and stirred until homogeneous.

When the aqueous phase and the oil phase have attained their required temperatures, Diethylethanolamine is added to the oil phase, which is kept at 120-125° C. for 5 minutes.

Subsequently the oil phase is added slowly into the water phase and kept at to 95-100° C. while under vigorously mixed conditions for 15 minutes. Then cooling of the product starts and Proxel GXL is added at a temperature between 75-80° C. The product is poured into containers when it reaches pouring viscosity between 73-78° C.

EXAMPLE VII

A shoe care product was prepared by mixing the following ingredients in percentages by weight according to the manufacturing procedure below:

Water Phase

| | | |
|---|---|---|
| Water demineralised | 65.2 | |
| 2-Amino-2-methyl-1-propanol | 0.5 | ANGUS Chemie GmbH |
| HD Sperse Black EP880 | 1 | Holliday Dispersions Ltd, UK |
| Sodium Benzoate | 0.2 | DSM, Netherlands |
| Proxel GXL | 0.1 | Avecia Limited, UK |

Oil Phase

| | | |
|---|---|---|
| Priolene 6900 | 2 | Uniqema, Netherlands |
| Arlacel 186 | 2.5 | Uniqema, Netherlands |
| Licowax F | 2 | Clariant, Germany |
| Microflex 4M | 0.5 | Luzatto & Figlio, France |
| Paraflint A28 | 4 | Sasolwax, Germany |
| Paraffine 58/60 | 10.5 | Total Solvants, France |
| Dow Corning 200 Fluid 12500 cSt | 0.5 | Dow Corning Europe, Belgium |
| Exxsol D60 | 11 | Esso Chemie Nederland, Netherlands |

Manufacturing Procedure:

Add all the water to a water heating vessel(s). The water phase should reach a temperature of 98° C. at the same time as the oil phase reaches a temperature of 98° C.

Oil phase: Add paraffin 58-60, Microflex 4M, Licowax F, Paraflint A28, Dow Corning 200 Fluid, 12500 cSt to the mixing vessel and start melting at temperature of 125° C. When molten add Arlacel 186, Priolene 6900 and Exxsol D60. Adjust temperature to 98° C. while mixing.

When both phases have attained their desired temperatures (98° C. for the oil and 98° C. for the water phase). Add Na-benzoate, the carbon black dispersion, Proxel GXL and the 2-Amino-2-methyl-1-propanol to the water phase. When temperature of 98° C. is reached again keep for 2 minutes at this.

Then slowly add, while mixing at maximum speed, the water phase into the wax phase in such a manner that the water is mixed directly into the wax phase. Keep temperature up at 95-98° C. and mix for 10 minutes.

Start cooling the polish while proceeding mixing at maximum speed. Remove cooling water from the vessel jacket at 75° C. Keep the temperature at 75° C. Filling temperature 68-73° C.

EXAMPLE VIII

A shoe care product was prepared by mixing the following ingredients in percentages by weight according to the manufacturing procedure below:

| | | |
|---|---|---|
| Succinic Acid 99% | 0.23% | Acros Organics, Belgium |
| Demineralised water | 56.65% | |
| Sodium Hydroxide Pellets, Food Grade | 0.68% | Merck Nederland B.V., Netherlands |
| TerHell Paraffin 4110 | 8.84% | Sasolwax, Germany |
| Microflex M4 | 1.40% | Luzatto & Figlio, France |
| Lanolin Anhydryde | 0.93% | Croda GmbH, Germany |
| Q8 Puccini 19P | 0.47% | Kuwait Petroleum N.V., Belgium |
| Paraflint AP5 | 3.35% | Sasolwax, Germany |
| Priolene 6900 | 1.40% | Uniqema, Netherlands |
| Pristerene 4900 | 1.21% | Uniqema, Netherlands |
| Licowax S | 4.07% | Clariant, Germany |
| Hydrogenated Castor Oil | 1.40% | BOM Brasil Oleo de Mamona TDA, Brasil |

Premix 1

| | | |
|---|---|---|
| 98% Calcium L-Lactate Pentahydrate | 0.43% | Acros Organics, Belgium |
| Water, demineralised | 2.33% | |

Premix 2

| | | |
|---|---|---|
| Pyramid G80 | 2.79% | Brenntag, Belgium |
| Succinic Acid 99% | 0.09% | Acros Organics, Belgium |
| Water, demineralised | 6.51% | |

Premix 3

| | | |
|---|---|---|
| Lissamine Gelb R 200% | 0.12% | BASF Italia Spa, Italy |
| Nigrosine WLN VP SP 25002 | 0.47% | Bayer Nederland BV, Netherlands |
| Water, demineralised | 6.24% | |
| HD Sperse Black EP 880 | 0.23% | Holliday Dispersions Ltd, UK |
| Proxel GXL | 0.19% | Avecia Limited UK |

Manufacturing Method:

Succinic Acid, NaOH pellets and water are stirred and heated to around 95° C. In the mixing vessel.

Wax phase comprising TerHell Paraffin 4110, Microflex M4, Lanolin Anhydryde, Q8 Puccini 19P, Paraflint AP5, Priolene 6900, Pristerene 4900, Licowax S, Hydrogenated Castor Oil is heated to 125° C. in wax melting vessel and is stirred until homogenous.

Subsequently the wax is emulsified into the water phase. Emulsifying proceeds at the temperature around 99.5° C. for 5 minutes.

Premix 1 is prepared by dissolving Calcium L-Lactate Pentahydrate in water. After 5 minutes wax emulsifying, Premix 1 is added into the wax emulsion for saponification. Saponification proceeds at the temperature around 99.3° C. for 10-15 minutes.

After saponification, the emulsion is cooled down. Around 95° C., cool premix 2 is added to polish emulsion.

At 75° C. premix 3 is added to the polish emulsion. During further cooling, at a right viscosity and temperature (around 64-69° C.), the paste is poured into containers,

EXAMPLE IX

A shoe care product was prepared by mixing the following ingredients in percentages by weight according to the manufacturing procedure below:

| | | |
|---|---|---|
| Licowax S | 4 | Clariant Germany |
| Pristerene 4900 | 2.1 | Uniqema, Netherlands |
| Priolene 6900 | 1 | Uniqema, Netherlands |
| Stenol 16–18 | 2 | Cognis Oleochemicals, Germany |
| Diethylethanolamine | 1.92 | BASF, Germany |
| CaCl.2 H2O | 0.33 | Merck, Germany |
| Paraflint AP5 | 3.6 | Sasolwax, Germany |
| Microflex M4 | 3 | Luzatto & Figlio, France |
| TerHell Paraffin 4110 | 9 | Sasolwax, Germany |
| Q8 Puccini 19P | 0.5 | Kuwait Petroleum N.V., Belgium |
| Baysilonol M 350 cSt | 0.75 | Bayer, Germany |
| Dow Corning 200 Fluid 50 cSt | 0.75 | Dow Corning Europe, Belgium |
| Sodium benzoate | 0.4 | DSM, Netherlands |
| Polyglycol 35000 | 1 | Clariant, Germany |
| Proxel GXL | 0.2 | Avecia Limited UK |
| Demineralised Water | 69.45 | |

Manufacturing Procedure:

Licowax S, Pristerene 4900, Priolene 6900, Stenol 16-18 Paraflint AP5, Microflex M4, TerHell Paraffin 4110, QS Puccini 19P, Baysilonol M350 cSt, Dow Corning Fluid 200, 50 cSt are loaded into wax melting vessel, heated to 120-125° C. and stirred until homogeneous.

Demineralised water, sodium benzoate, polyglycol 35000 are loaded into mixing vessel, heated to 95-100° C. and stirred until homogeneous.

Into 5% of demineralised water, which is kept apart, the CaCl.2H2O is dissolved into a premix I.

When the aqueous phase and the oil phase have attained their required temperatures, Diethyl ethanol amine is added to the oil phase, which is kept at 120-125° C. for 5 minutes.

Subsequently the oil phase is added slowly into the water phase and kept at to 95-100° C. while under vigorously mixed conditions for 5 minutes. Subsequently the premix I, containing the $CaCl_2$ is added into the emulsion and kept at to 95-100° C. while under vigorously mixed conditions for 10 minutes. Then cooling of the product starts and Proxel GXL is added at a temperature between 75-80° C. The product is poured into containers when it reaches pouring viscosity between 70-75° C.

EXAMPLE X

| | | |
|---|---|---|
| Licowax S | 6 | Clariant Germany |
| Pristerene 4900 | 2.6 | Uniqema, Netherlands |
| Portugese gumrosin | 1.00 | Interensco NV, |

WW Code Romax

| | | |
|---|---|---|
| Diethyl ethanol amine | 1.08 | BASF, Germany |
| 1.3-Propanediamine | 0.43 | BASF, Germany |
| Prifat 9833 | 8.75 | Unimills, Netherlands |
| Carnauba Grise Grasse T4 | 5.25 | Fasting & Co., Netherlands |
| Sodium Nitrite | 0.10 | BASF Corp., New Jersey |
| Sodiumbenzoate | 0.10 | DSM, Netherlands |
| Proxel CF | 0.3 | Avecia Limited, UK |
| Water, demineralised | 74.39 | |

Manufacturing Procedure:

Add 73.89% demineralised water to the mixing vessel. The water phase should reach a temperature of 95° C. at the same time as the wax phase reaches a temperature of 105° C.

Add Prifat 9838 and Pristeren 4900 to the wax melting vessel and start heating to temperature of 100° C. When molten add Licowax S and Carnauba T4. When molten add Portugese Gumrosin. Adjust temperature to 105° C. When both phases have attained their desired temperatures (105° C. for the wax and 95° C. for the water phase) add Diethyl ethanol amine to wax phase and mix for 2 minutes at 105° C. Add 1,3-propanediamine to water phase just before mixing the wax into the water phase of 95° C. Then slowly add the wax phase into the water phase in such a manner that the wax is directly mixed into the water in the course of ten minutes. Keep temperature up at 90-95° C. and mix for 5 minutes.

Start cooling polish. At 80° C. add NaNO2, Sodium Benzoate and Proxel CF to the polish. Filling temperature 70-75° C.

The invention claimed is:

1. Shoe or leather care product in the form of a water continuous emulsion comprising:
   an aqueous phase comprising 60-90% by weight of total product,
   an oil phase comprising 1-35% by weight of total product, and
   an emulsifier system comprising a surfactant in an amount of 0.2-10% by weight of total product and a co-emulsifier in an amount of 0.2-16% by weight of total product, wherein the co-emulsifier comprises a multivalent metal soap,
   wherein the product has a VOC below 22 wt. %, based on the weight of the product.

2. Shoe or leather care product according to claim 1, wherein the VOC is below 15 wt. %.

3. Shoe or leather care product according to claim 1, having a penetration value below 60 units of 0.1 mm.

4. Shoe or leather care product according to claim 3, having a penetration value between 5 and 40 units of 0.1 mm.

5. Shoe or leather care product according to claim 1, wherein the VOC is below 5 wt. %.

6. Shoe or leather care product according to claim 1, wherein the VOC is below 1 wt. %.

7. Shoe care product according to claim 1, wherein the oil phase, comprises 1-35 wt. % of a wax based on the weight of the product.

8. Shoe care product according to claim 7, wherein the wax constitutes 1-25 wt. % based on the weight of the product.

9. Shoe care product according to claim 7, wherein the wax is chosen from the group of mineral waxes, paraffins, microcrystalline waxes, plant derived waxes, animal waxes, Fisher Tropsch waxes, polyolefin waxes, synthetic waxes and combinations thereof.

10. Shoe care product according to claim 9, wherein the total wax has a congealing point between 30° and 100° C.

11. Shoe or leather care product according to claim 9, wherein the total wax has a congealing point between 40° and 90° C.

12. Shoe care product according to claim 9, wherein the total wax has a congealing point between 45° and 80° C.

13. Shoe or leather care product according to claim 1, wherein the surfactant is a non-ionic or amphoteric surfactant.

14. Shoe or leather care product according to claim 13, wherein the surfactant is a neutralized fatty acid.

15. Shoe or leather care product in the form of a water continuous emulsion comprising:
   an aqueous phase comprising 60-90% by weight of total product,
   an oil phase comprising 1-35% by weight of total product, and
   an emulsifier system comprising a surfactant in an amount of 0.2-10% by weight of total product and a co-emulsifier in an amount of 0.2-16% by weight of total product, wherein the co-emulsifier comprises a multivalent metal soap formed from a first component chosen from the group of carboxylic acids, fatty acids and a combination thereof and a second component which is a multivalent cation,
   wherein the product has a VOC below 22 wt. %, based on the weight of the product and wherein the surfactant is a cationic or anionic surfactant.

16. Shoe or leather care product according to claim 15, wherein each constituent material of the first component of the co-emulsifier has a HLB value below 13.

17. Shoe or leather care product according to claim 15, wherein the multivalent cation is a multivalent metal cation.

18. Shoe or leather care product according to claim 15, wherein the multivalent cation is a calcium, magnesium or zinc cation.

19. Shoe or leather care product according to claim 1, wherein the multivalent metal soap is calciumstearate, calciumlaurate, calciumarachinate, zincstearate, zirclaurate, zincarachinate, magnesiumstearate, aluminumstearate.

20. Shoe or leather care product in the form of a water continuous emulsion comprising:
   an aqueous phase comprising 60-90% by weight of total product,
   an oil phase comprising 1-35% by weight of total product, and
   an emulsifier system comprising a surfactant in an amount of 0.2-10% by weight of total product and a co-emulsifier in an amount of 0.2-16% by weight of total product, wherein the co-emulsifier comprises a multivalent metal soap formed from a first component chosen from the group of carboxylic acids, fatty acids and a combination thereof and a second component which is a multivalent cation,
   wherein the product has a VOC below 22 wt. %, based on the weight of the product and wherein the co-emulsifier further comprises a fatty alcohol or derivative thereof, a fatty acid ester or derivative thereof, a fatty amide or derivative thereof, a fatty amine or derivative thereof or a fatty amine oxide or derivative thereof.

21. Shoe or leather care product according to claim 20, wherein the derivative of a fatty alcohol is an alkoxylated fatty alcohol.

22. Shoe care product according to claim 1, wherein the co-emulsifier constitutes 0.5-13 wt. % of the total product.

23. Shoe or leather care product according to claim 1, having a total summation of the saponification value, the hydroxyl value, and the nitrogen value as defined of all the raw material components in the product with more than 14 carbon atoms per molecule in the shoe care product of between 0.5-40 mg KOH per gram.

24. Shoe or leather care product according to claim 1 wherein the product is a shoe polish, a shoe cream, a self polishing composition, an impregnated towel or sponge or an aerosol.

25. Shoe or leather care product according to claim 24 wherein the product is for the care of nubuck- or suede.

26. Shoe or leather care product according to claim 1 wherein the aqueous phase comprises up to 20% optional ingredients.

27. Shoe or leather care products according to claim 26 wherein the optional ingredients are chosen from the group of silicones, colouring agents, humectants, anti-corrosives, preserving agents, defoamers, salts and combinations thereof.

28. Shoe or leather care products according to claim 27 comprising 0.05-2 wt. % based on the product of one or more salts.

29. Shoe or leather care products according to claim 28 comprising 0.15-0.6 wt. % based on the product of one or more salts.

30. Shoe or leather care product according to claim 1, comprising 0.1-10% silicone.

31. Shoe or leather care product according to claim 30, comprising one or more dimethicone copolyollpolyether modified polydimethylsiloxanes with a HLB value below 8.

32. Method for cleaning or treating shoes wherein an amount of a shoe care product according to claim 1 is applied to the outer surface of a shoe.

33. Shoe or leather care product according to claim 15, wherein the multivalent metal soap is calciumstearate, calciumlaurate, calciumarachinate, zincstearate, zirclaurate, zincarachinate, magnesiumstearate, aluminumstearate.

34. Shoe or leather care product according to claim 20, wherein the multivalent metal soap is calciumstearate, calciumlaurate, calciumarachinate, zincstearate, zirclaurate, zincarachinate, magnesiumstearate, aluminumstearate.

35. Shoe or leather care product according to claim 1, wherein the surfactant is a cationic or anionic surfactant.

* * * * *